US011886170B2

(12) United States Patent
Nagata

(10) Patent No.: US 11,886,170 B2
(45) Date of Patent: Jan. 30, 2024

(54) CONTROL SYSTEM, SETTING DEVICE AND SETTING PROGRAM

(71) Applicant: OMRON CORPORATION, Kyoto (JP)

(72) Inventor: Yuta Nagata, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 35 days.

(21) Appl. No.: 17/434,183

(22) PCT Filed: Feb. 7, 2020

(86) PCT No.: PCT/JP2020/004845
§ 371 (c)(1),
(2) Date: Aug. 26, 2021

(87) PCT Pub. No.: WO2020/189086
PCT Pub. Date: Sep. 24, 2020

(65) Prior Publication Data
US 2022/0147021 A1 May 12, 2022

(30) Foreign Application Priority Data
Mar. 15, 2019 (JP) .................................. 2019-049105

(51) Int. Cl.
*G05B 19/418* (2006.01)
(52) U.S. Cl.
CPC ... *G05B 19/4183* (2013.01); *G05B 19/41855* (2013.01)
(58) Field of Classification Search
USPC .......................................................... 700/1
See application file for complete search history.

(56) References Cited

U.S. PATENT DOCUMENTS

| 2002/0062410 A1 | 5/2002 | Sasamori et al. |
| 2008/0215325 A1 | 9/2008 | Horii et al. |
(Continued)

FOREIGN PATENT DOCUMENTS

| CN | 101213580 A | 7/2008 |
| CN | 101568905 A | 10/2009 |
(Continued)

OTHER PUBLICATIONS

Extended European Search Report dated Nov. 7, 2022, issued in European Application No. 20773713.1.
International Search Report for PCT/JP2020/004845 dated Apr. 14, 2020 [PCT/ISA/210].
Written Opinion for PCT/JP2020/004845 dated Apr. 14, 2020 [PCT/ISA/237].
(Continued)

*Primary Examiner* — Hien D Khuu
(74) *Attorney, Agent, or Firm* — Sughrue Mion, PLLC

(57) ABSTRACT

A control system includes a control device, one or more information processing devices, and an arithmetic unit. The control device executes a control program controlling a control target while managing process data of the control program, and includes a communication processor that periodically transmits one or more data sets, each data set including a value of one or more process data. The information processing devices executes one or more applications using the process data included in the data sets. The arithmetic unit determines a transmission setting of the data set, and includes an acquirer that acquires the process data for each application, and a determiner that determines a number of data sets transmitted by the communication processor and the process data to be included in each data set according to an evaluation criterion regarding a communication load based on the process data for each application.

16 Claims, 17 Drawing Sheets

(56) References Cited

U.S. PATENT DOCUMENTS

| | | | |
|---|---|---|---|
| 2012/0254350 A1 | 10/2012 | Ito et al. | |
| 2013/0054765 A1* | 2/2013 | Baret | G05B 19/0423 709/220 |
| 2015/0356220 A1* | 12/2015 | Southerland | G05B 19/05 703/15 |
| 2016/0109875 A1* | 4/2016 | Majewski | G05B 19/0426 700/98 |
| 2016/0110304 A1* | 4/2016 | Mori | G05B 19/0423 710/306 |
| 2016/0292197 A1 | 10/2016 | Morimoto et al. | |
| 2017/0034033 A1 | 2/2017 | Mizoguchi | |
| 2018/0011466 A1* | 1/2018 | Murayama | G05B 19/05 |
| 2018/0050450 A1* | 2/2018 | Parrott | H04W 4/027 |
| 2019/0001484 A1* | 1/2019 | Parrott | B25J 9/0084 |
| 2019/0272197 A1* | 9/2019 | Adachi | G06F 9/4818 |
| 2020/0125061 A1* | 4/2020 | Miyasaka | G05B 19/058 |
| 2020/0150614 A1* | 5/2020 | Johnston | G05B 19/056 |

FOREIGN PATENT DOCUMENTS

| | | |
|---|---|---|
| CN | 107851097 A | 3/2018 |
| JP | 6-110850 A | 4/1994 |
| JP | 2002-077200 A | 3/2002 |
| JP | 2015-207170 A | 11/2015 |
| JP | 2016-100846 A | 5/2016 |
| JP | 2017-146803 A | 8/2017 |
| JP | 2018-090007 A | 6/2018 |
| RU | 2004 129 311 A | 4/2005 |
| RU | 2357278 C2 * | 5/2009 |
| WO | 2020/059719 A1 | 3/2020 |

OTHER PUBLICATIONS

Chinese Office Action dated Nov. 7, 2023 in Application No. 202080017199.2.

\* cited by examiner

FIG.8

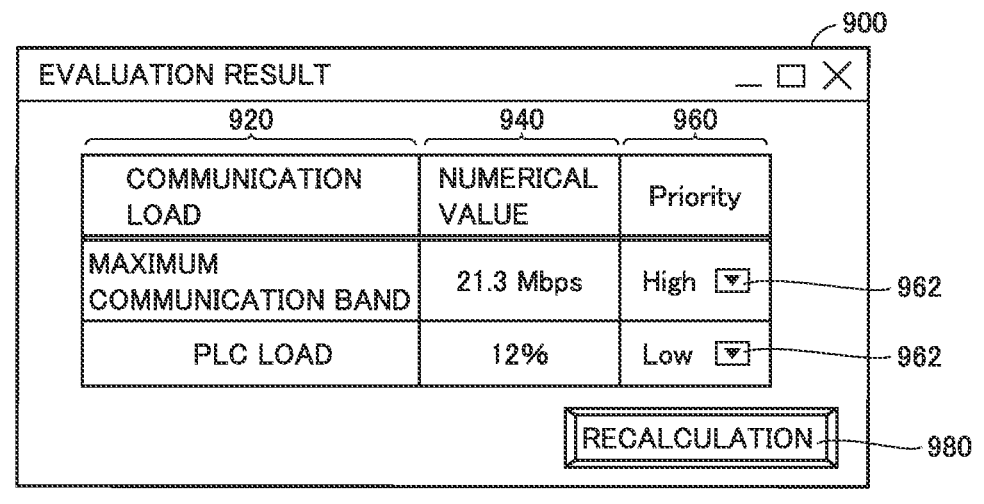

| COMMUNICATION LOAD | NUMERICAL VALUE | Priority |
|---|---|---|
| MAXIMUM COMMUNICATION BAND | 21.3 Mbps | High ▼ |
| PLC LOAD | 12% | Low ▼ |

EVALUATION RESULT

RECALCULATION (1) MOUNTING ON SETTING DEVICE
(2) MOUNTING ON MONITORING DEVICE
(3) MOUNTING ON RELAY DEVICE

CONTROL SYSTEM, SETTING DEVICE AND SETTING PROGRAM

CROSS REFERENCE TO RELATED APPLICATIONS

This application is a National Stage of International Application No. PCT/JP2020/004845 filed Feb. 7, 2020, claiming priority based on Japanese Patent Application No. 2019-049105 filed Mar. 15, 2019, the entire contents of each of which being herein incorporated by reference in their entireties.

TECHNICAL FIELD

The present invention relates to a function of supporting setting of a communication environment between a control device and an information processing device that executes one or a plurality of applications using communication data transmitted by the control device.

BACKGROUND ART

A control device such as a PLC (Programmable Logic Controller) is introduced in various manufacturing sites. The control device is a kind of computer, and executes a control program designed according to a manufacturing device or a manufacturing facility. Such a control device is communicably connected to an information processing device such as a human machine interface (HMI).

For example, the information processing device uses information from the control device to graphically display an operating state or the like of a control target of the control device, or uses information from the control device to execute an application different from the application that is displayed.

For example, Japanese Patent Laying-Open No. 2017-146803 (PTL 1) discloses a program display as an example of the information processing device connected to the PLC. In the program display, when one screen displayed on the display screen is set as one page, layout of functional components displayed on the page, assignment of functions, and the like are performed in units of pages.

CITATION LIST

Patent Literature

PTL 1: Japanese Patent Laying-Open No. 2017-146803

SUMMARY OF INVENTION

Technical Problem

PTL 1 does not describe how to specifically acquire information necessary for implementing the function allocated to each page. Information (hereinafter, referred to as "process data") of the control device which is the PLC is used for an application implementing this function. A user needs to perform transmission setting on the control device in order to transmit the process data used for the application.

An object of the present invention is to easily perform the transmission setting in which the process data necessary for execution of the application is transmitted from the control device to the information processing device.

Solution to Problem

According to one aspect of the present disclosure, a control system including a control device, one or a plurality of information processing devices, and an arithmetic unit is provided. The control device configured to execute a control program controlling a control target while managing a plurality of pieces of process data referred to or updated in the control program. The control device includes a communication processing unit configured to periodically transmit one or a plurality of predetermined data sets. Each data set transmitted by the communication processing unit includes a value of one or a plurality of predetermined process data in the plurality of pieces of process data. Each of one or a plurality of information processing devices executes one or a plurality of applications using the value of the process data included in the one or the plurality of data sets transmitted from the control device. An arithmetic unit determines a transmission setting of the data set by the communication processing unit of the control device. The arithmetic unit includes an acquisition unit and a determination unit. The acquisition unit acquires the process data necessary for each of the one or the plurality of applications executed in the information processing device for each of the one or the plurality of information processing devices. The determination unit determines a number of data sets transmitted by the communication processing unit and the process data to be included in each data set according to a predetermined evaluation criterion regarding a communication load based on the process data necessary for each application acquired by the acquisition unit.

According to this disclosure, the transmission setting can be easily performed such that the process data necessary for execution of the application is transmitted from the control device toward the information processing device. Furthermore, because the number of data sets and the process data to be included in each data set are determined according to the evaluation criterion regarding the communication load, the appropriate transmission setting considering the communication load is designed according to the application.

In the above disclosure, the evaluation criterion may include a communication load index that evaluates a load applied to the control device by periodically transmitting each of the one or the plurality of data sets while the communication processing unit generates the one or the plurality of data sets.

According to this disclosure, because the evaluation criterion includes the communication load index evaluating the load on the control device, the transmission setting can be designed such that the load on the control device is reduced.

In the above disclosure, the evaluation criterion may include a communication performance index that evaluates a type of the process data receivable by the information processing device during a predetermined period.

According to this disclosure, the transmission setting capable of reducing a time lag between timing at which the value of the process data is updated and timing at which the process data is used by the application can be designed.

In the above disclosure, the evaluation criterion may include a communication efficiency index that evaluates communication efficiency between the control device and the one or the plurality of information processing devices.

According to this disclosure, the transmission setting having high communication efficiency can be designed.

In the above disclosure, the determination unit may include a worth determination unit configured to determine worth of the process data for each of the process data acquired by the acquisition unit. The evaluation criterion may include an index that evaluates the worth of the process data included in each data set.

According to this disclosure, the transmission setting can be designed such that the high-worth process data can be preferentially transmitted.

In the above disclosure, the worth determination unit may determine the worth of the process data according to the importance of the information processing device configured to use the process data. The control system may further include a unit configured to receive importance of the information processing device.

According to this disclosure, for example, the transmission setting in which the process data used in an application executed by an arbitrary information processing device is preferentially transmitted can be designed.

In the above disclosure, the control system may further includes a management unit configured to determine a data set that validates transmission in one or a plurality of data sets transmittable by the communication processing unit according to an application that is executed in the one or the plurality of information processing devices. The evaluation criterion may include a management load index that evaluates a load on the management unit by managing determination of the validation of each of the one or the plurality of data sets.

According to this disclosure, because the transmitted data can be limited according to the currently-executed application, the data set including the process data used for the application that is not executed can be prevented from being transmitted. Furthermore, in such the control system, although the processing load is imposed on the management unit, the processing load is included in the evaluation criterion, so that the processing load preventing such the transmission can be reduced while preventing the transmission of the data set that is not used. As a result, the transmission setting capable of reducing the processing load applied to the entire control system can be designed.

In the above disclosure, the evaluation criterion may include a plurality of evaluation indexes. The control system may further include a unit configured to receive importance of each of the plurality of evaluation indexes.

According to this disclosure, an arbitrary transmission setting can be designed by changing the importance of each evaluation index.

In the above disclosure, the control system may further include a monitoring device configured to monitor a communication load. The monitoring device may include the arithmetic unit. Furthermore, the monitoring device may include an update unit configured to update the evaluation criterion according to a result of monitoring the communication load. The determination unit determines the number of data sets transmitted by the communication processing unit and the process data to be included in each data set according to the evaluation criterion updated by the update unit.

According to this disclosure, the actual data exchange between the control device and the information processing device can be reflected in the transmission setting.

According to another aspect of the present disclosure, a setting device configured to support setting of a communication environment between a control device and one or a plurality of information processing devices. The control device configured to execute a control program controlling a control target while managing a plurality of pieces of process data referred to or updated in the control program. The control device includes a communication processing unit configured to periodically transmit one or a plurality of predetermined data sets. Each data set transmitted by the communication processing unit includes a value of one or a plurality of predetermined process data in the plurality of pieces of process data. The setting device includes an acquisition unit and a determination unit. Each of one or a plurality of information processing devices executes one or a plurality of applications using the value of the process data included in the one or the plurality of data sets transmitted from the control device. The acquisition unit acquires the process data necessary for each of the one or the plurality of applications executed in the information processing device for each of the one or the plurality of information processing devices. The determination unit determines a number of data sets transmitted by the communication processing unit and the process data to be included in each data set according to a predetermined evaluation criterion regarding a communication load based on the process data necessary for each application acquired by the acquisition unit.

According to this disclosure, the transmission setting can be easily performed such that the process data necessary for execution of the application is transmitted from the control device toward the information processing device. Furthermore, because the number of data sets and the process data to be included in each data set are determined according to the evaluation criterion regarding the communication load, the appropriate transmission setting considering the communication load is designed according to the application.

According to another aspect of the present disclosure, a setting program configured to support setting of a communication environment between a control device and one or a plurality of information processing devices is provided. The control device configured to execute a control program controlling a control target while managing a plurality of pieces of process data referred to or updated in the control program. The control device includes a communication processing unit configured to periodically transmit one or a plurality of predetermined data sets. Each data set transmitted by the communication processing unit includes a value of one or a plurality of predetermined process data in the plurality of pieces of process data. The setting device includes an acquisition unit and a determination unit. Each of one or a plurality of information processing devices executes one or a plurality of applications using the value of the process data included in the one or the plurality of data sets transmitted from the control device. The setting program causes a computer to execute: acquiring process data necessary for each of the one or the plurality of applications executed in the information processing unit for each of the one or the plurality of information processing devices; and determining a number of data sets transmitted by a communication processing unit and process data to be included in each data set according to a predetermined evaluation criterion regarding a communication load based on the process data necessary for each application acquired in the acquiring process data.

According to this disclosure, the transmission setting can be easily performed such that the process data necessary for execution of the application is transmitted from the control device toward the information processing device. Furthermore, because the number of data sets and the process data to be included in each data set are determined according to the evaluation criterion regarding the communication load, the appropriate transmission setting considering the communication load is designed according to the application.

Advantageous Effects of Invention

According to the present disclosure, the transmission setting can be easily performed such that the process data necessary for the execution of the application is transmitted from the control device to the information processing device.

BRIEF DESCRIPTION OF DRAWINGS

FIG. 8 is a view illustrating an example of a user interface 900 that receives priority information 358.

DESCRIPTION OF EMBODIMENTS

Figure 1:
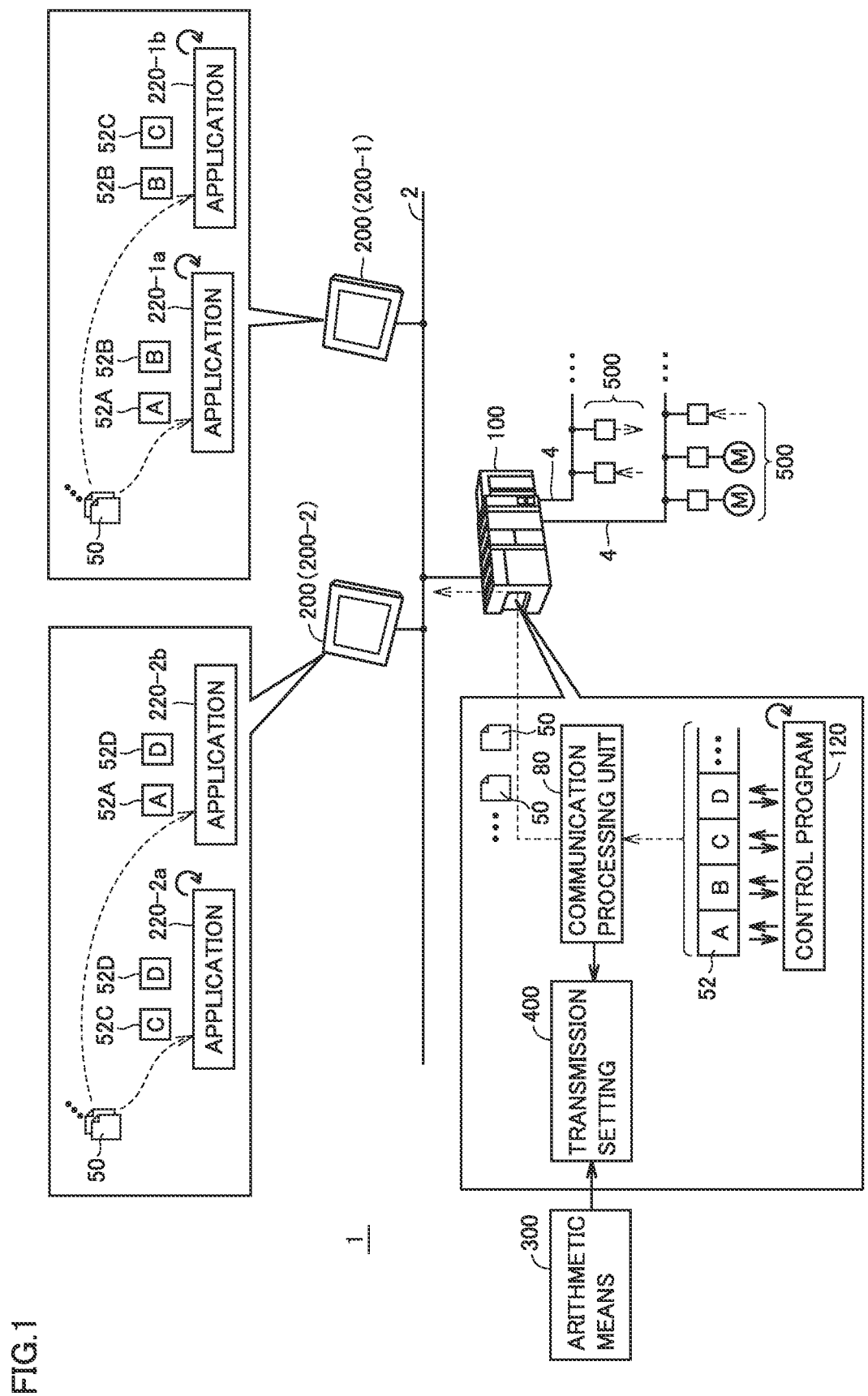
FIG. 1 is a schematic diagram illustrating an application scene of a control system 1.

With reference to the drawings, an embodiment of the present invention will be described below. In the following description, the same component and constituent are denoted by the same reference numeral. Their names and functions are the same. Thus, the detailed description thereof will not be repeated. The following embodiment and modification described below may selectively be combined as appropriate.

A. Application Example

FIG. 1 is a schematic diagram illustrating an application scene of a control system 1. Control system 1 includes arithmetic means 300 that provides a function of supporting setting of a communication environment between a controller 100 and an HMI 200.

Control system 1 includes controller 100 and HMI 200. Controller 100 is communicably connected to HMI 200 through an information system network 2. For example, information system network 2 is a network conforming to a communication standard capable of performing data exchange without depending on a vendor, a type of an operating system (OS), or the like. For example, object linking and embedding for process control unified architecture (OPC UA) is known as the communication standard.

The communication standard adopted in information system network 2 is not limited to the OPC UA. For example, information system network 2 may be a network conforming to the communication standard specific to a specific vendor or OS, or may be a network conforming to EtherNet/IP (registered trademark) that is an industrial open network in which a control protocol is mounted on Ethernet (registered trademark).

In the example of FIG. 1, communication between HMI 200 and controller 100 is performed by a publish-subscribe communication scheme of the OPC UA.

Hereinafter, communication to which a publish-subscribe communication scheme of the OPC UA is applied is also referred to as PubSub communication.

Control system 1 may include a plurality of controllers 100. Control system 1 may include a plurality of HMIs 200. In addition, control system 1 may have a configuration in which one HMI 200 is communicably connected to one controller 100, a configuration in which one HMI 200 is communicably connected to a plurality of controllers 100, a configuration in which a plurality of HMIs 200 are communicably connected to one controller 100, or a configuration in which the plurality of HMIs 200 are communicably connected to the plurality of controllers 100. In the example of FIG. 1, control system 1 has a configuration in which two HMIs 200 (HMIs 200-1, 200-2) are communicably connected to one controller 100. Hereinafter, the plurality of HMIs 200 will be referred to as HMIs 200-1, 200-2 when being distinguished from each other.

Controller 100 is an example of the control device of the present invention, executes a control program 120 in order to control a control target, and executes main processing in control system 1. In the example of FIG. 1, controller 100 is communicably connected to a field device 500 that is a control target through control system network 4. Preferably, a network that performs fixed-period communication guaranteeing a data arrival time is used as control system network 4. EtherCAT (registered trademark), EtherNet/IP (registered trademark), DeviceNet (registered trademark), CompoNet (registered trademark), and the like are known as the network that performs the fixed-period communication.

Field device 500 includes various industrial devices that automate a production process, and includes a device that gives some physical action to a manufacturing device, a production line, or the like (hereinafter, also collectively referred to as a "field") and an input and output device that exchanges information with the field. For example, field device 500 includes a servo driver that controls a servo motor, a robot controller that controls a robot, a sensor that is a device that collects data, an actuator that moves a conveyor, a remote input and output (I/O) device, or the like.

Controller 100 controls field device 500 by executing control program 120. In addition, controller 100 manages a plurality of pieces of process data 52 that are referred to or updated by the execution of control program 120.

As used herein, the "process data" is a term that encompasses any data that can be referenced by control means (typically embodied as controller 100) or application execution means (typically embodied as HMI 200). More specifically, the "process data" may include input data acquired from the field device, output data (command value) calculated by the control operation and provided to the field device, data temporarily calculated in order to execute the control arithmetic operation, data indicating operation content by the user, and the like.

Process data 52 includes data input from field device 500 to controller 100, data output from controller 100 to field device 500, and data used for the execution of control program 120 or state management of controller 100. Process data 52 is periodically updated in association with the execution of control program 120.

Controller 100 includes a communication processing unit 80 that periodically transmits one or a plurality of data sets 50. Each data set 50 includes one or a plurality of predetermined process data 52 among the plurality of pieces of process data 52 managed by controller 100. Communication processing unit 80 generates and transmits data set 50 according to transmission setting 400 determined by arithmetic means 300.

HMI 200 is an example of the information processing device of the present invention, and executes an application 220 using a value of process data 52 included in data set 50 transmitted by controller 100. Hereinafter, the value of process data 52 may be simply referred to as "process data 52". HMI 200 executes application 220 to present various types of information obtained by the execution of control program 120 to the operator.

HMI 200 may directly receive data set 50 transmitted by controller 100 from controller 100, or receive data set 50 through another device such as a relay device.

The information processing device that executes application 220 using process data 52 managed by controller 100 is not limited to HMI 200. For example, the information processing device may be a database that collects information regarding traceability measured from field device 500 that is the control target, a supervisory control and data acquisition (SCADA) device that performs the process control and centralized monitoring, or the like.

Furthermore, the information processing device is not limited to the device connected to controller 100 through information system network 2, but may be a robot controller that controls a robot connected through control system network 4, an actuator, another controller, or the like. That is, application 220 is not limited to one intended to present the information, but may be one intended to implement the function using process data 52 managed by controller 100. In the following, the application is intended to present the information, and will be described as a program that provides a function of displaying an image on the display.

At an execution stage of application 220, HMI 200 executes application 220 using the value of process data 52 included in data set 50 distributed from controller 100. Application 220 may be distributed in a state stored in a memory card or a database in an installable format, or may be produced by the user.

In the example of FIG. 1, HMI 200-1 executes an application 220-1a using process data 52A, 52B and an application 220-1b using process data 52B, 52C. HMI 200-2 executes an application 220-2a using process data 52C, 52D and an application 220-2b using process data 52A, 52D.

Arithmetic means 300 determines data set transmission setting 400 by communication processing unit 80 of controller 100. Typically, a processor of a support device that provides a development environment of application 220 executes a support program, thereby implementing the function of arithmetic means 300. Arithmetic means 300 may be implemented by a dedicated setting device. In addition, a relay device may be provided between HMI 200 and controller 100, and the function of arithmetic means 300 may be implemented by the relay device.

Figure 2:
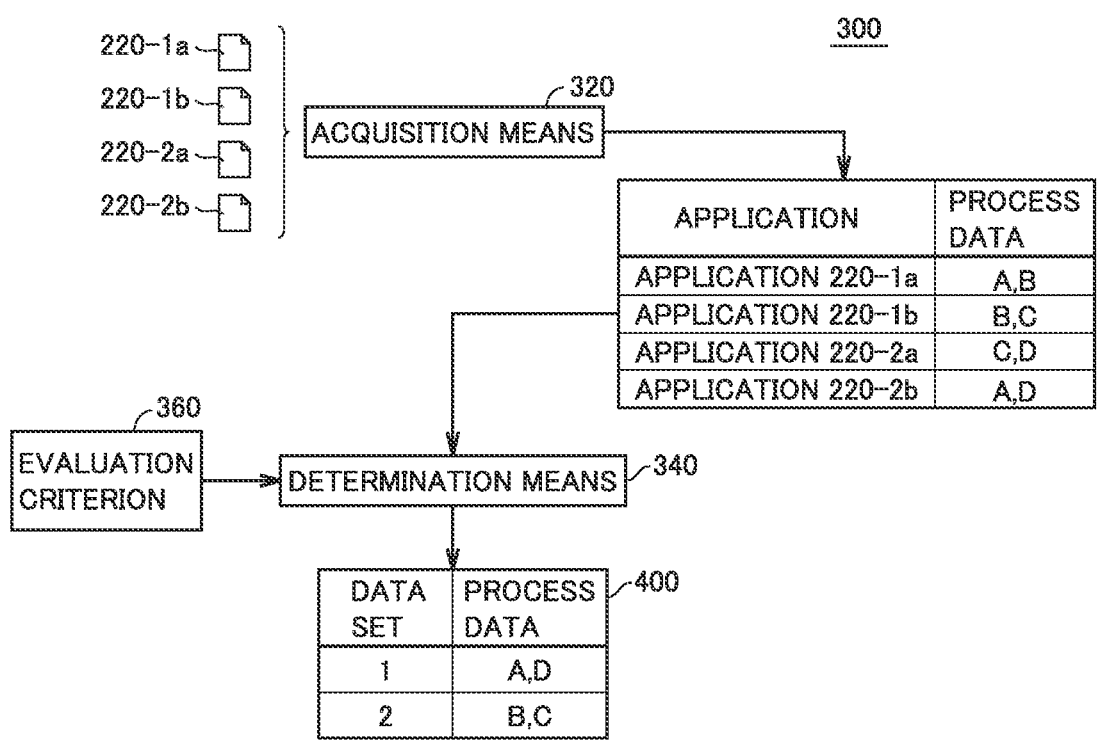
FIG. 2 is a view illustrating an outline of a functional configuration of arithmetic means 300.

FIG. 2 is a view illustrating an outline of a functional configuration of arithmetic means 300. Referring to FIG. 2, arithmetic means 300 includes acquisition means 320 and determination means 340. Acquisition means 320 acquires process data 52 necessary for each of one or a plurality of applications 220 executed by HMI 200 for each of HMI 200-1 and HMI 200-2.

Acquisition means 320 acquires process data 52 necessary for each of applications 220 for each of applications 220-1a, 200-1b, 200-2a, 200-2b.

Specifically, acquisition means 320 specifies which process data 52 among the plurality of pieces of process data 52 managed by controller 100 should be output onto information system network 2. In the example of FIG. 1, acquisition means 320 specifies that process data 52 used by applications 220-1a, 200-1b, 200-2a, 200-2b is process data 52A, 52B, 52C, 52D.

Determination means 340 determines the number of data sets 50 transmitted by communication processing unit 80 and process data 52 to be included in each data set 50 such that each process data 52 used in application 220 of each HMI 200 is transmitted from controller 100 to each HMI 200. A candidate of "the number of data sets 50 transmitted by communication processing unit 80 and process data 52 to be included in each data set 50" determined by determination means 340 may be plural, and the final determination may be made by the user.

That is, determination means 340 determines in what combination process data 52 used in each application 220 of each HMI 200 is transmitted. Specifically, determination means 340 determines in what combination process data 52A, 52B, 52C, 52D used in applications 220-1a, 200-1b, 200-2a, 200-2b are transmitted.

For example, in the example of FIG. 2, determination means 340 determines the number of data sets 50 transmitted by communication processing unit 80 as two, and determines process data 52 to be included in the two data sets 50 as process data 52A and process data 52D, and process data 52B and process data 52C. That is, determination means 340 generates transmission setting 400 that defines that data set 50-1 storing the value of process data 52A and the value of process data 52D and data set 50-2 storing the value of process data 52B and the value of process data 52C are generated and transmitted.

Determination means 340 determines a combination of process data 52 to be transmitted based on evaluation criterion 360 regarding a communication load. More specifically, determination means 340 determines the combination of process data 52 to be transmitted by solving an optimization problem of "advance result of evaluation of a combination of process data 52 to be transmitted according to evaluation criterion 360".

An algorithm solving the optimization problem is not limited. For example, the algorithm such as dynamic programming may be utilized.

For example, evaluation criteria 360 include viewpoints of a load on communication processing unit 80 of controller 100, communication performance defined according to a period in which the value of process data 52 is transmitted to each HMI 200 or a data amount transmitted at once, or a load on information system network 2, importance of each process data 52 in the entire system, and the like. Furthermore, evaluation criterion 360 may be configured to be able to be designated by the user.

For example, the "importance of each process data 52 in the entire system" means a frequency (use frequency) at which process data 52 is used in application 220, the importance in the entire system of HMI 200 that executes application 220 using process data 52, and worth of process data 52 itself. For example, transmission setting 400 can be designed to preferentially transmit important process data 52 by reflecting the "importance of each process data 52 in the entire system" in evaluation criterion 360.

As described above, because the combination (data set) of process data 52 to be transmitted is determined based on evaluation criteria 360 regarding the communication load, control system 1 can appropriately design transmission setting 400 in consideration of the communication load according to application 220.

In the embodiment, four types of the process data are used in entire control system 1 in order to simplify the description. However, in an actual production site, more types of process data are used for applications, and a user hardly manually perform transmission setting 400 in consideration of the communication load of entire control system 1. As described in the embodiment, because arithmetic means 300 determines transmission setting 400 based on evaluation criterion 360 regarding the communication load, the communication between controller 100 and HMI 200 can be easily performed by transmission setting 400 in consideration of the communication load of entire control system 1.

B. PubSub Communication

Figure 3:
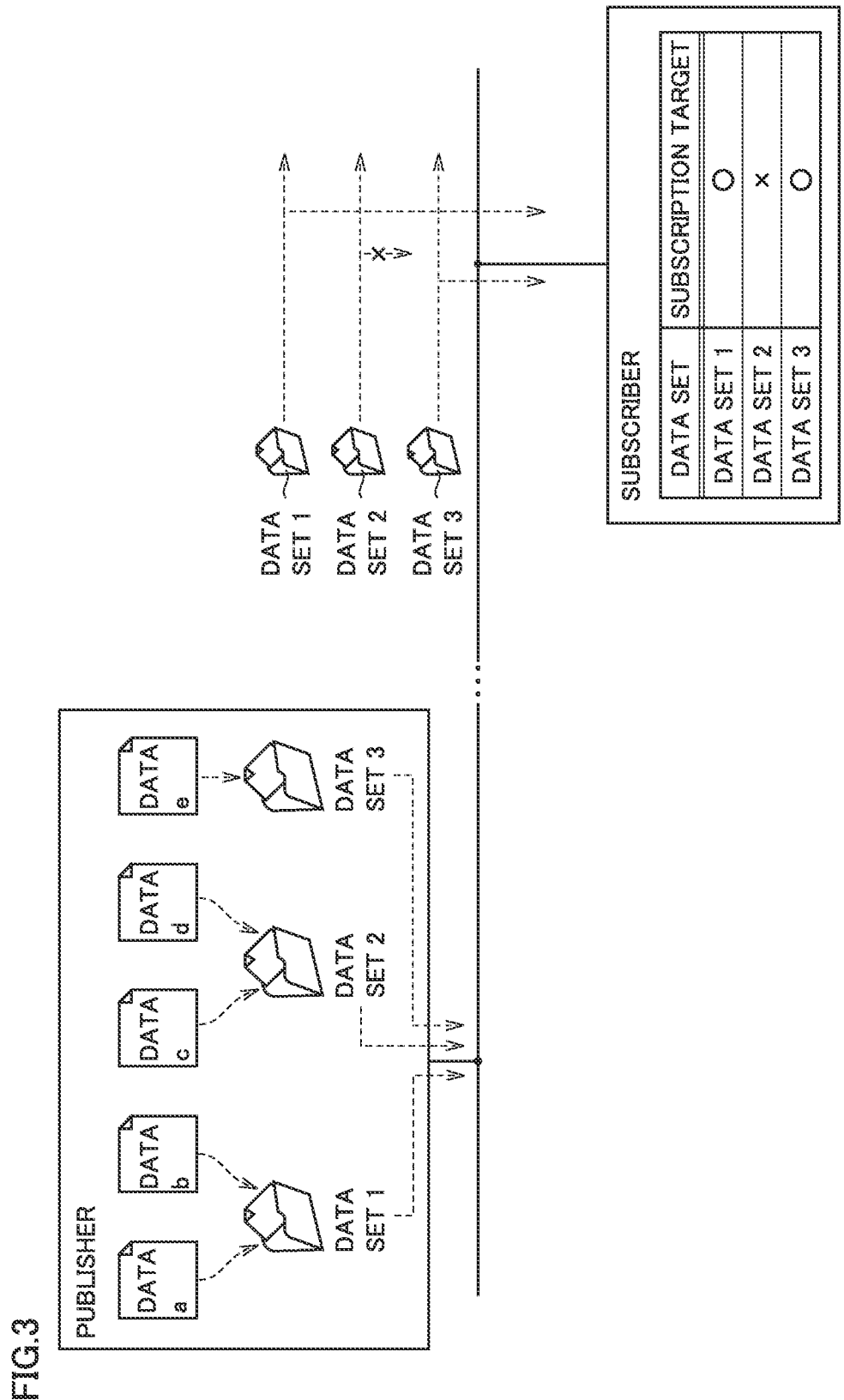
FIG. 3 is a view illustrating an outline of PubSub communication.

FIG. 3 is a view illustrating an outline of PubSub communication. In the following description, a side that distributes data is referred to as a "publisher", and a side that subscribes to data distributed by the publisher is referred to as a "subscriber". In control system 1 according to the embodiment, controller 100 corresponds to the publisher that distributes the data. On the other hand, HMI 200 corresponds to the subscriber that subscribes to the data distributed by controller 100.

The publisher generates and distributes a data set storing one or a plurality of pieces of data. The publisher transmits the data set to a network including the publisher and the subscriber without specifying a destination. This transmission form may be multicast or unicast. Depending on circumstances, this transmission form may be broadcast.

The subscriber manages which data set is set to a subscription target among data sets distributed on the network accessible by the subscriber. For example, in the example of FIG. 2, the subscriber subscribes to a data set 1 and a data set 3 among data sets 1 to 3. For this reason, the subscriber receives only data set 1 and data set 3 among data sets 1 to 3 distributed by the publisher. When the subscriber changes the subscription target, the subscriber changes a reception target.

The subscriber may receive the data set that is not the subscription target, and in this case, the subscriber may perform processing of discarding the data set that is not the subscription target.

The method by which the subscriber manages the subscription target is not limited to the method in FIG. 3. For example, whether to subscribe for each data may be managed. As another method, whether to subscribe to each set of data different from the data set may be managed.

Figure 4:
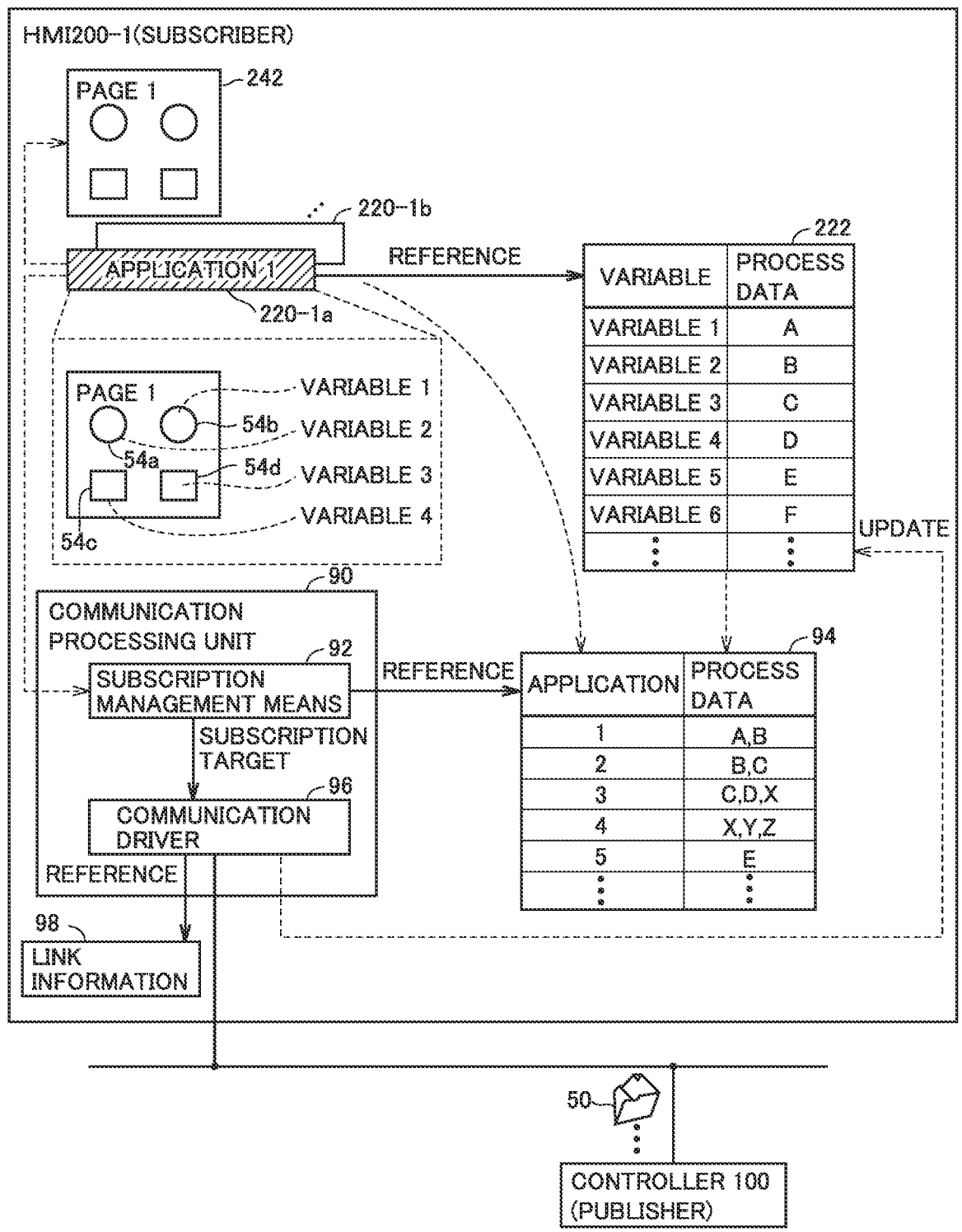
FIG. 4 is a view illustrating an outline of an HMI 200-1 that functions as a subscriber.
Figure 5:
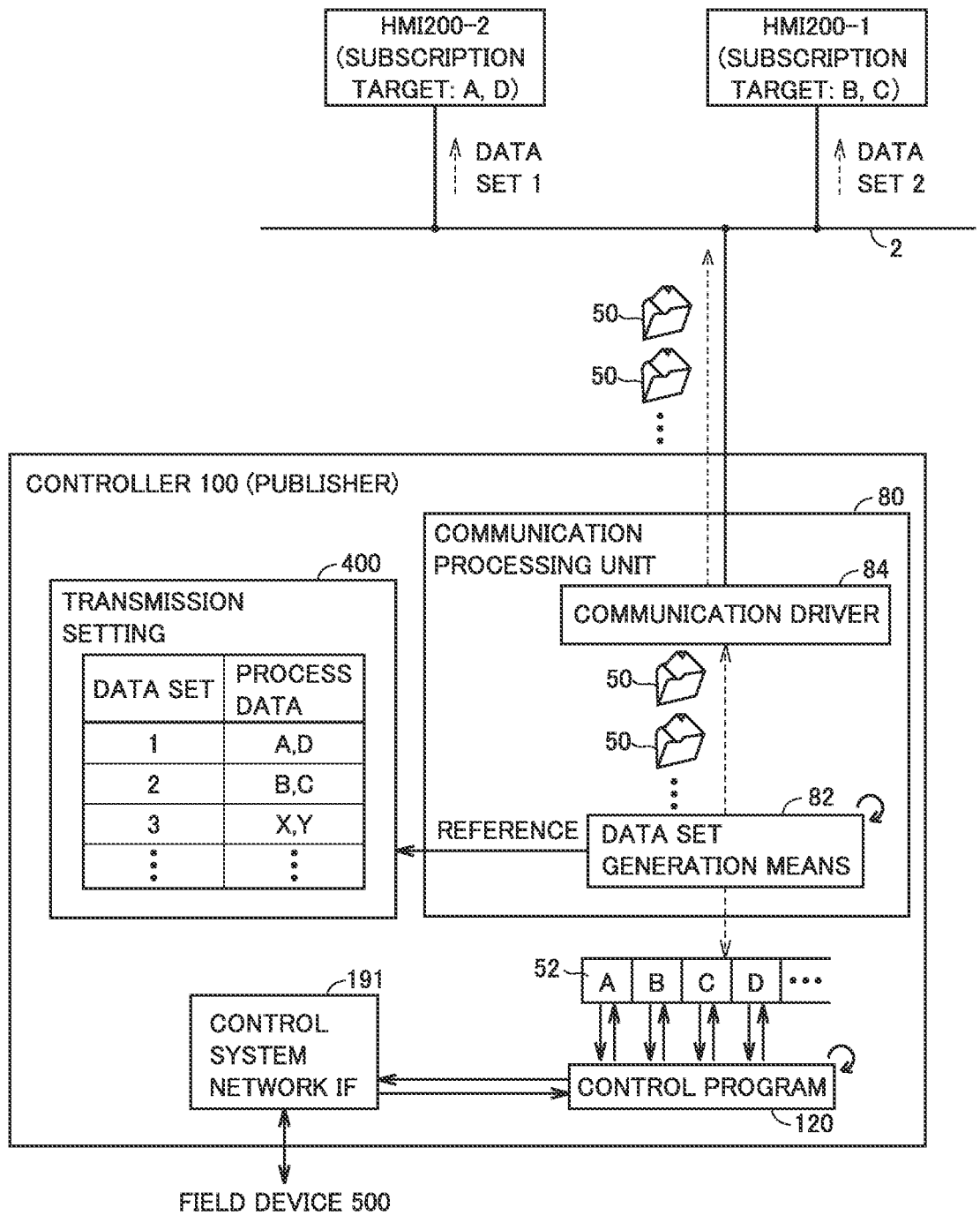
FIG. 5 is a view illustrating an outline of a controller 100 that functions as a publisher.

With reference to FIGS. 4 and 5, an outline of PubSub communication between HMI 200 and controller 100 will be described. FIG. 4 is a view illustrating an outline of HMI 200-1 that functions as the subscriber. FIG. 5 is a view illustrating an outline of controller 100 that functions as the publisher. In FIG. 4, HMI 200-1 will be described as an example, but HMI 200-2 also has the same configuration as HMI 200-1.

Referring to FIG. 4, HMI 200-1 includes a display 242, a plurality of applications 220 (220-1a, 220-1b . . . ), and a communication processing unit 90 that is an OPC UA client. Each application 220 is a program displaying a specific page on display 242. FIG. 4 illustrates an example in which an application 1 displaying page 1 on display 242 is executed.

Each page includes a plurality of objects 54. For example, page 1 includes an object 54a to an object 54d. The display of object 54 is updated according to a value of a variable included in the program. For example, the display of object 54a is updated according to the value of a variable 1. Similarly, the display of object 54b is updated according to the value of a variable 2, the display of object 54c is updated according to the value of variable 1, and the display of object 54d is updated according to the value of variable 2.

Application 220 refers to mapping information 222 to update the value of the variable. Mapping information 222 is information in which the variable and the process data are associated with each other. For example, the value of variable 1 is updated according to the value of process data 52A. The period at which the value of each process data is updated may be set by the user according to the production of application 220, or determined according to the update period of controller 100 that manages the process data.

Communication processing unit 90 is an OPC UA client, and causes HMI 200 to function as the subscriber. Communication processing unit 90 includes a subscription management means 92 and a communication driver 96.

Subscription management means 92 manages the subscription target according to currently-executed application 220. Specifically, subscription management means 92 refers to subscription management information 94 generated based on application 220 and mapping information 222 to specify the subscription target, and notifies communication driver 96 of the subscription target. Communication driver 96 receives data set 50 including process data 52 of the subscription target, and updates the value of process data 52 used by application 220.

Subscription management information 94 is information in which application 220 is associated with process data 52 used in application 220, and is generated based on application 220 and mapping information 222.

For example, when application 1 is executed, subscription management means 92 refers to subscription management information 94 and specifies that process data 52A, 52B are used for executing application 1. Subscription management means 92 notifies communication driver 96 of the start of subscription to process data 52A, 52B. When the execution target of the application is switched, subscription management means 92 also notifies communication driver 96 of the information about process data 52 stopping the subscription together with the information about process data 52 starting the subscription.

Communication driver 96 reads data set 50 including process data 52 of the subscription target from among the plurality of data sets 50 distributed by controller 100. More specifically, communication driver 96 refers to link information 98 specifying process data 52 stored in each data set 50, and specifies data set 50 including process data 52 of the subscription target from among the plurality of data sets 50 delivered by controller 100.

Link information 98 is generated at timing when transmission setting 400 is generated by arithmetic means 300. The subject that refers to link information 98 is not limited to communication driver 96. For example, the entity that refers to link information 98 may be subscription management means 92. In this case, data set 50 necessary for obtaining the value of process data 52 necessary for the execution of application 220 is specified, and data set 50 specified to the communication driver is given notice of as the subscription target.

Referring to FIG. 5, controller 100 includes control program 120, a control system network interface (IF) 191, and communication processing unit 80 that is the OPC UA server.

Controller 100 executes control program 120 to control field device 500. For example, control program 120 updates the value of process data 52 using the state value of field device 500 input through control system network IF 191, and executes the control arithmetic calculation with reference to the updated value of process data 52. Control program 120 updates the value of process data 52 according to the result of the executed control arithmetic calculation, and outputs the updated value of process data 52 as the control value to field device 500 through control system network IF 191.

Communication processing unit 80 is an OPC UA server, and causes controller 100 to function as the publisher. Communication processing unit 80 includes data set generation means 82 that generates data set 50 and a communication driver 84 that transmits data set 50.

Data set generation means 82 refers to transmission setting 400 to generate data set 50 storing one or a plurality of pieces of process data 52. Data set 50 may refer to a set of process data 52 or a data set in a format that can be output onto information system network 2.

Transmission setting 400 is information that specifies process data 52 stored in one data set 50. Only one process data 52 may be specified to be stored in one data set 50, or the plurality of pieces of process data 52 may be specified to be stored in one data set. That is, the term "data set" means a combination of one or more process data 52 stored in data set 50.

That is, controller 100 generates the data set according to transmission setting 400. Thus, the processing load on controller 100 is reduced as compared with the case where transmission setting 400 defines the process data of a specific attribute as one data set.

Transmission settings 400 may include information that defines a condition that generates data set 50. For example, a condition that generates data set 50 may be defined such that data set 50 is generated at every period in which the value of process data 52 is updated with the execution of control program 120. In this case, the combination of process data 52 included in data set 50 is preferably defined in consideration of the generation condition.

Communication driver 84 distributes data set 50 generated by data set generation means 82 onto information system network 2.

With reference to FIG. 5, data exchange between HMI 200 and controller 100 when the subscription targets of HMI-1 are process data 52B, 52C and the subscription targets of HMI 200-2 are process data 52A, 52D will be described. In FIG. 5, the reference numeral is partially omitted from process data 52A, 52B, 52C, 52D.

Controller 100 periodically generates each of data sets 1, 2, 3, . . . and the plurality of data sets 50 and transmits each of data sets 1, 2, 3, . . . and the plurality of data sets 50 on the information system network 2. It is assumed that process data 52A and process data 52D are stored in data set 1, process data 52B and process data 52C are stored in data set 2, and process data 52X and process data 52Y are stored in data set 3.

HMI 200-1 acquires data set 2 in which the values of process data 52B and process data 52C that are the subscription target are stored among the plurality of data sets 50 distributed from controller 100. Because data set 2 is periodically transmitted, HMI 200-1 periodically acquires data set 2. Thus, HMI 200-1 can periodically update the variables corresponding to process data 52B and process data 52C, and also updates the display of object 54 according to the update of the variables.

HMI 200-2 acquires data set 1 in which process data 52A and process data 52D that are the subscription target are stored among the plurality of data sets 50 distributed from controller 100. Because data set 1 is periodically transmitted, HMI 200-2 periodically acquires data set 1. Thus, HMI 200-2 can periodically update the variables corresponding to process data 52A and process data 52D, and also updates the display of object 54 according to the update of the variables.

When the application of the execution target changes, communication processing unit 90 of HMI 200 changes the subscription target and changes data set 50 of the read target. Hereinafter, changing the subscription target is also referred to as "changing the subscription request".

As described above, in the PubSub communication, even when the application of the execution target is changed, it is not necessary to change the processing on the publisher side. For this reason, the PubSub communication can reduce the number of exchanges performed between the data transmission side and the data reception side as compared with the command and response scheme communication.

On the other hand, communication processing unit 90 of HMI 200 also changes the subscription request according to the change of application 220 of the execution target. In order to implement the PubSub communication between controller 100 and HMI 200, the side of controller 100 (publisher) needs to generate data set 50 so as to satisfy each subscription request that changes according to a change of application 220. That is, the user needs to design transmission setting 400 of controller 100 so as to satisfy the subscription request specialized for each of all applications 220 executed by HMI 200 that is the subscriber.

When the plurality of applications 220 that use process data 52 managed by controller 100 exist, a method for storing process data 52 used by application 220 in each application 220 in one data set 50 and transmitting process data 52 can be considered. However, such a method does not consider the communication load applied to the entire network including controller 100 and HMI 200 by transmitting and receiving data set 50. For this reason, although there is no problem in the case where the amount of data exchanged between controller 100 and HMI 200 is small, there is a possibility that the transmission period of data set 50 cannot be secured or the transmission speed is extremely lowered due to the limit of the communication performance of information system network 2 in the case where the amount of data increases.

In the embodiment, because the combination (data set) of process data 52 to be transmitted based on evaluation criterion 360 regarding the communication load is determined, control system 1 can design appropriate transmission setting 400 in consideration of the network including controller 100 and HMI 200 and application 220.

C. Functional Configuration of Determination Means

Figure 6:
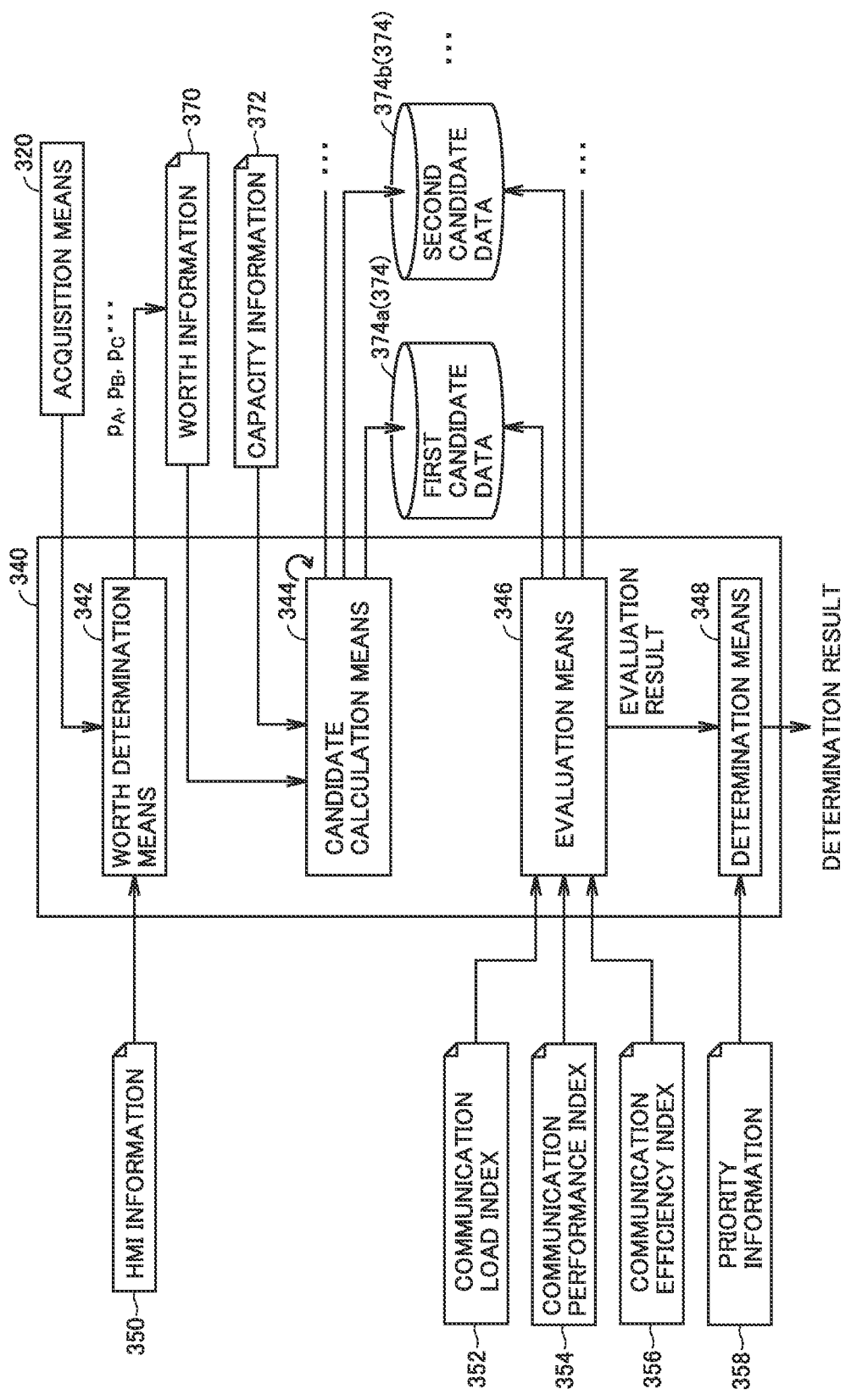
FIG. 6 is a view illustrating an example of arithmetic calculation executed by determination means 340.

With reference to FIG. 6, an example of an arithmetic method executed by determination means 340 will be described. FIG. 6 is a diagram illustrating an example of the arithmetic operation executed by determination means 340. In the example of FIG. 6, determination means 340 acquires a combination candidate of process data 52 in order to transmit a problem acquiring the combination of process data 52 as a "knapsack problem". When a plurality of acquired candidates exist, determination means 340 evaluates each candidate according to an evaluation index that is not incorporated in the "knapsack problem".

Referring to FIG. 6, determination means 340 includes worth determination means 342, candidate calculation means 344, evaluation means 346, and determination means 348.

Worth determination means 342 determines the worth of process data 52. For example, worth determination means 342 converts the importance of process data 52 in the entire system into the worth. Specifically, worth determination means 342 determines the worth of each piece of process data necessary for each application 220 acquired by acquisition means 320, and generates worth information 370 indicating the worth of each piece of process data 52. For example, worth determination means 342 estimates the worth of the process data 52 from the frequency at which the process data 52 is used and the importance of HMI 200 using the process data 52 in the system.

For example, the importance of HMI 200 using process data 52 in the system is calculated from HMI information 350. For example, HMI information 350 includes information that can specify which HMI 200 is registered as a master device and which HMI 200 is registered as an auxiliary device. HMI information 350 may include an operation status indicating a use frequency of HMI 200. In the embodiment, HMI information 350 is information indicating the master unit and the auxiliary unit.

HMI 200-1 according to the embodiment is the master unit (mainly-used HMI) in control system 1, and HMI 200-2 is the auxiliary unit (HMI used as a sub-unit) in control system 1. The information is registered as HMI information 350. For example, HMI information 350 is registered by the user when application 220 is installed in HMI 200 or when application 220 is developed.

For example, a worth p of one piece of process data 52 is calculated by the following Equation (1).

[Mathematical Formula 1]

Mathematical Formula 1

$$p = \sum_{i=1}^{i=2} \alpha_i n \quad (1)$$

At this point, i specifies the type of HMI 200, i=1 indicates HMI 200-1, and i=2 indicates HMI 200-2. $\alpha$ is importance in the system of HMI 200 obtained from HMI information 350. n indicates a frequency at which process data 52 is used in application 220 executed by HMI 200. For example, when HMI 200 can execute five applications 220 and specific process data 52 is used by three applications 220 among five applications 220, frequency n at which process data 52 is used becomes 3/5. Frequency n may reflect the use frequency of the application.

The worth calculation method is an example, and for example, the worth of process data 52 itself may be further reflected in the above Equation (1). For example, the high worth may be given to process data 52 used for determination of generation of an error, and the lower worth may be given to process data 52 used for logging than process data 52 used for the determination of the generation of the error.

In FIG. 6, $p_A$ indicates the worth of process data 52A, $p_B$ indicates the worth of process data 52A, and $p_C$ indicates the worth of process data 52C.

Candidate calculation means 344 sets a data size of process data 52 to a "weight", the worth of process data 52 estimated by worth determination means 342 to the "worth", and the data capacity of one packet to "a capacity of knapsack", and determines a combination of process data 52 that maximizes the sum of worth of process data 52 stored in one packet.

The data capacity of the packet is obtained as capacity information 372. Capacity information 372 may be information determined previously as the performance of information system network 2, or information set to a temporary value by the user. The data size of process data 52 is previously determined for each process data 52.

Candidate calculation means 344 stores the determined combination in candidate data 374 as process data 52 to be included in one data set. Candidate calculation means 344 excludes process data 52 stored in candidate data 374 from the candidates of process data 52 stored in the packet, and again determines the combination of process data 52 that maximizes the sum of the worth of process data 52 stored in one packet.

That is, candidate calculation means 344 determines the combination of process data 52 while including the index evaluating the worth of the process data included in the data set as the evaluation criterion. As a result, for example, transmission setting 400 can be designed such that high-worth process data 52 can be preferentially transmitted.

Specifically, the worth of each determined data set 50 can be determined based on the worth of process data 52 included in data set 50, and transmission setting 400 can be designed to preferentially transmit data set 50 having high worth.

Candidate calculation means 344 repeats the determination of the combination of process data 52, the storage of the determined combination in candidate data 374, and the exclusion of process data 52 stored in candidate data 374 from among the candidates of process data 52 stored in the packet until the candidate of process data 52 stored in the packet is eliminated.

Candidate calculation means 344 may perform a series of processing until the candidate of process data 52 stored in the packet is eliminated a plurality of times, and acquire a plurality of pieces of candidate data (first candidate data 374a, second candidate data 374b, . . . ). When the series of processing is performed the plurality of times, candidate calculation means 344 may change an algorithm determining the combination of process data 52 that maximizes the sum of the worth of process data 52 stored in one packet each time. Although the algorithm is not particularly limited, and examples thereof include a dynamic programming method, a greedy method, and a genetic algorithm.

Furthermore, even when the series of processing is executed by the same algorithm, a plurality of candidate data is obtained when a plurality of solutions are obtained. The processing of candidate calculation means 344 may be terminated when one candidate data is acquired. In the following description, it is assumed that the plurality of pieces of candidate data 374 is acquired.

Evaluation means 346 evaluates each of the plurality of candidate data 374 based on a predetermined index. In the example of FIG. 6, evaluation means 346 evaluates each of the plurality of pieces of candidate data 374 based on each of a communication load index 352, a communication performance index 354, and a communication efficiency index 356.

Communication load index 352 is an index evaluating the load when controller 100 transmits data set 50. For example, communication load index 352 uses the number of data sets included in candidate data 374, the number of process data stored in one data set, the data size of one data set, and the like as an index.

When the number of data sets included in candidate data 374 is small, the number of times controller 100 transmits data set 50 can be reduced, an interval for transmitting the data set can be made, and the communication load on controller 100 can be reduced.

That is, when the evaluation is made according to communication load index 352, evaluation means 346 enhances the evaluation of the candidate data 374 of the evaluation target as each of the number of data sets included in candidate data 374, the number of process data stored in one data set, and the data size of one data set is smaller. As a result, transmission setting 400 can be designed such that the load applied to controller 100 is reduced.

Communication performance index 354 is an index evaluating the performance of the data delivered to HMI 200, and is an index evaluating the type of process data that can be received by HMI 200 during a predetermined period and is used in the application executed in HMI 200. For example, communication performance index 354 uses the period in which the data set is transmitted to HMI 200, the type of the process data 52 used in the application executed in HMI 200 among process data 52 included in data set 50 distributed to HMI 200, and the like.

When the evaluation is made according to communication performance index 354, evaluation means 346 enhances the evaluation of candidate data 374 of the evaluation target as the number of types of process data 52 included in data set 50 distributed to HMI 200 during the predetermined period increases. However, the evaluation of candidate data 374 of the evaluation target is higher as the number of types of process data 52 used in HMI 200 is larger, not simply the number of types is larger. As a result, transmission setting 400 capable of reducing the time lag between the timing at which the worth of process data 52 is updated and the timing at which the process data is used by application 220 can be designed. That is, HMI 200 can accurately grasp the state of controller 100.

Communication efficiency index 356 is an index evaluating the communication efficiency between controller 100 and HMI 200. For example, communication efficiency index 356 uses the number of data (pps (packet per second), bps (bit per second)) that needs to be transmitted during a predetermined period as the load applied to information system network 2 that communicably connects controller 100 and HMI 200.

When the evaluation is performed according to communication efficiency index 356, evaluation means 346 enhances the evaluation of candidate data 374 of the evaluation target as the number of data to be transmitted during a predetermined period is smaller. As a result, transmission setting 400 having the good communication efficiency can be designed. More specifically, the traffic can be reduced.

Determination means 348 determines which candidate data 374 among the plurality of candidate data 374 is appropriate based on the evaluation result of each candidate data 374 by evaluation means 346 according to the plurality of indexes and priority information 358, and sets appropriate candidate data 374 to a determination result.

Priority information 358 is information input by the user, and defines priorities (weighting) of the communication load, the communication performance, and the communication efficiency. Even when the plurality of candidate data 374 is evaluated according to each index by evaluation means 346, there may be no candidate data in which all the indexes are optimal. In this case, by defining the priority of each index using priority information 358, determination means 348 can determine the candidate data considered to be optimal even when there is no candidate data in which all indexes are optimal.

Arithmetic order in FIG. 6 is an example, and candidate calculation means 344 may determine the combination of process data 52 in consideration of at least one of communication load index 352, communication performance index 354, and communication efficiency index 356 that are referred to by evaluation means 346. That is, the method for calculating the plurality of candidate data 374, evaluating each candidate data 374, and determining transmission setting 400 is an example, and transmission setting 400 may be determined without calculating candidate data 374.

D. User Interface (D1. HMI Information)

Figure 7:
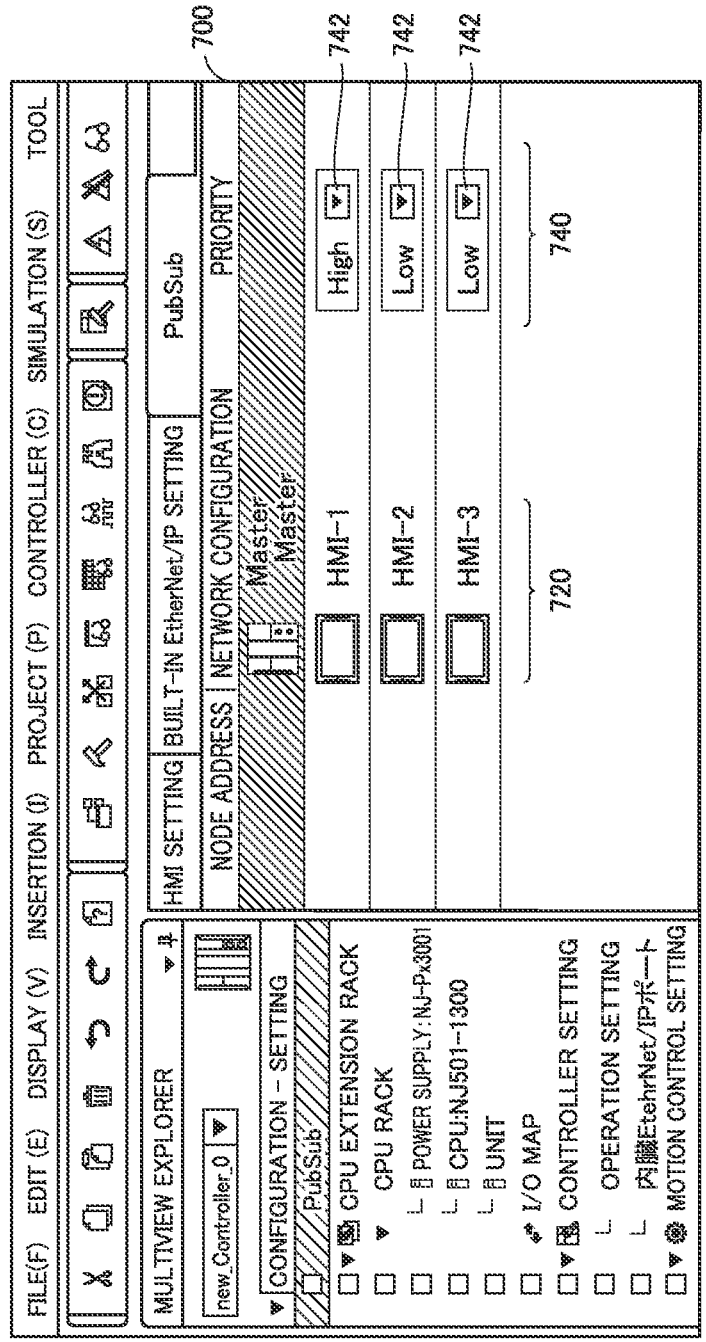
FIG. 7 is a view illustrating an example of a user interface 700 that receives HMI information 350.

FIG. 7 is a view illustrating an example of user interface 700 that receives HMI information 350. User interface 700 includes a network configuration region 720 indicating a network configuration and a reception region 740 that receives HMI information 350. Network configuration region 720 indicates HMI 200 connected to controller 100 (the master in FIG. 7).

Reception region 740 receives the designation of the priority of HMI 200 connected to controller 100. In the example of FIG. 7, either "High" or "Low" can be selected by an operating tab 742. Thus, which HMI among the plurality of HMIs (HMI-1, HMI-2, HMI-3) capable of displaying the information of controller 100 process data 52 is preferentially transmitted to can be defined. For example, among the plurality of HMIs, the priority of the HMI that functions as the master unit may be set to be high, and the priority of other HMIs may be set to be low, and the master unit and the auxiliary unit may be registered so as to be distinguished from each other.

In this way, the importance of each HMI can be reflected in the worth of process data 52, and for example, transmission setting 400 can be designed such that the process data used in the application executed by arbitrary HMI 200 designated by the user is preferentially distributed.

(D2. Priority Information)

FIG. 8 is a view illustrating an example of a user interface 900 that receives priority information 358. For example, user interface 900 in FIG. 8 is presented when the evaluation by evaluation means 346 is completed and when priority information 358 is necessary.

User interface 900 includes an index region 920 indicating the evaluation index, a result display region 940 indicating the result of the evaluation by the evaluation index, a priority reception region 960 that receives the input of the priority of the evaluation index, and a start button 980 that instructs the start of the evaluation.

When a tab 962 of priority reception area 960 is operated to input the priority of the evaluation index and when start button 980 is operated, the evaluation result in the case where candidate data 374 determined to be appropriate by determination means 348 is selected according to the input priority is displayed in result display region 940.

That is, when the plurality of evaluation indexes are provided, user interface 900 functions as means for receiving the importance of each evaluation index. User interface 900 allows the user to design arbitrary transmission setting 400 by changing the importance of each evaluation index. For example, when controller 100 places importance on the processing speed at which control program 120 is executed, the importance of the index regarding the processing load on controller 100 may be enhanced. On the other hand, when the performance of controller 100 is sufficiently high and when controller 100 can sufficiently execute control program 120 without sufficiently considering the processing load on controller 100, the importance of the index regarding the processing load on controller 100 may be lowered.

Although it has been described that the user interface that receives the importance of each evaluation index is provided in the case of necessity of priority information 358, the user interface may be provided at any timing. That is, the user interface that receives the importance of each evaluation index is not limited to the case where priority information 358 is necessary, but may be provided as one of the parameters determining transmission setting 400 before the arithmetic calculation by arithmetic means 300 is started.

E. Output of Arithmetic Result of Arithmetic Means 300

Figure 9:
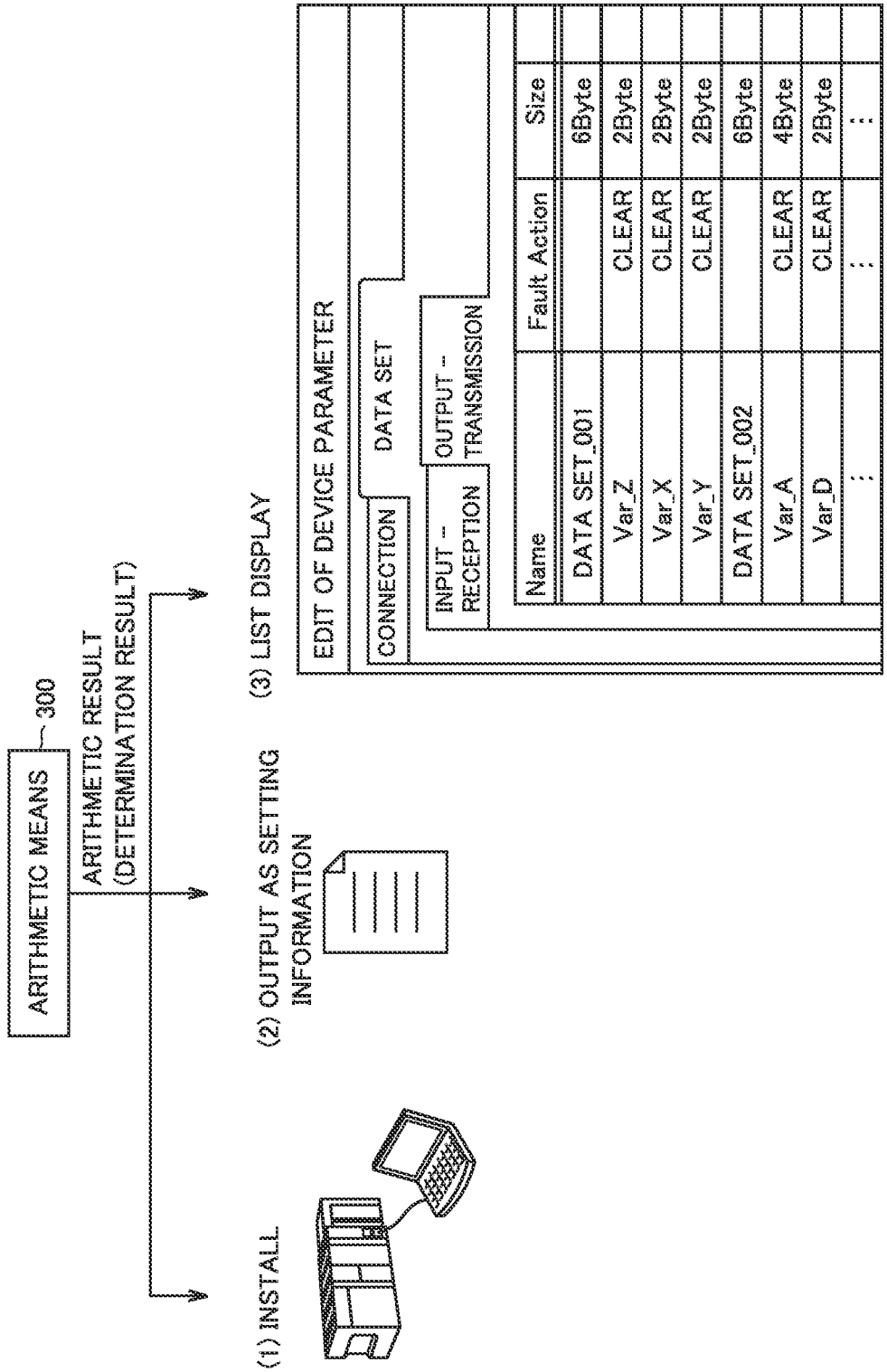
FIG. 9 is a view illustrating an output example of an arithmetic result by the arithmetic means 300.

FIG. 9 is a view illustrating an output example of the arithmetic result by arithmetic means 300. Arithmetic means 300 outputs the content of candidate data 374 that is the arithmetic result. For example, arithmetic means 300 installs the content of candidate data 374 selected as the determination result in controller 100 ((1) in FIG. 9). Arithmetic means 300 may perform the output as the setting information ((2) in FIG. 9). The setting information may be output in any format such as a comma-separated values (CSV) format, another file format, or a paper report format. By being output as the setting information, the transmission setting of controller 100 can be performed based on the setting information even when the direct install in controller 100 cannot be performed.

Arithmetic means 300 may display the content of candidate data 374 in a list ((3) in FIG. 9). After the list is displayed, correction by the user may be accepted. In this way, the user can reflect the evaluation index, which cannot be incorporated into the algorithm of arithmetic means 300, in transmission setting 400.

F. Mounting Example of Arithmetic Means 300

Figure 10:
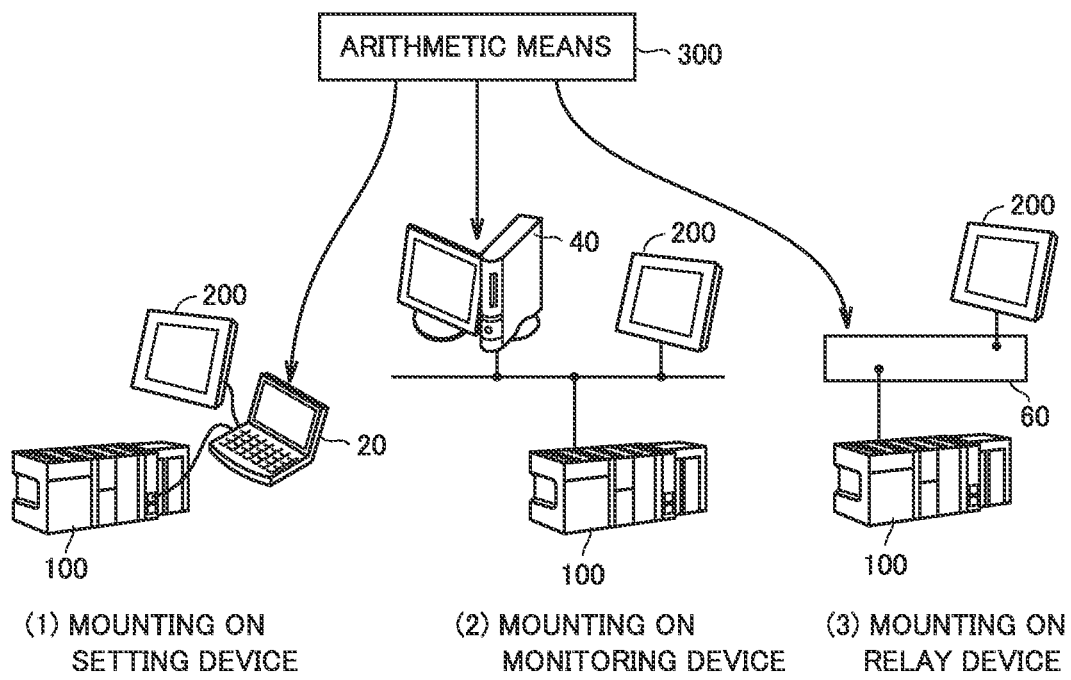
FIG. 10 is a view illustrating an implementation example of the arithmetic means 300.

A device on which arithmetic means 300 of the embodiment can be mounted and a use case when arithmetic means 300 mounted on the device will be described. FIG. 10 is a view illustrating a mounting example of arithmetic means 300.

Referring to FIG. 10, arithmetic means 300 is mounted on (1) a setting device 20 performing transmission setting, (2) a monitoring device 40 monitoring a network configured by controller 100 and HMI 200, or (3) a relay device 60 relaying the communication between controller 100 and HMI 200.

(f1. Setting Device)

Figure 11:
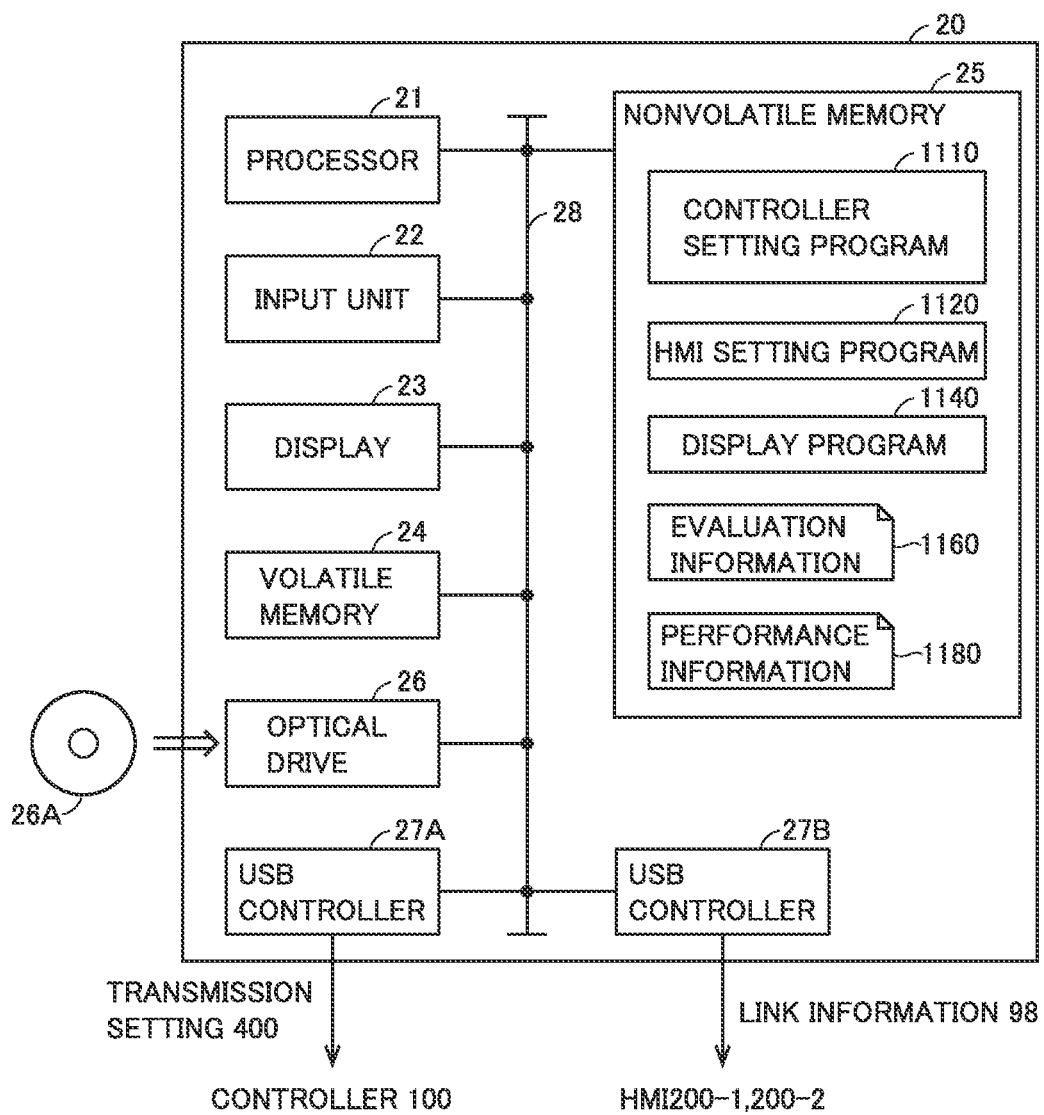
FIG. 11 is a view illustrating an example of a hardware configuration of a setting device 20.

For example, setting device 20 is used at the timing of starting the connection between controller 100 and HMI 200. FIG. 11 is a view illustrating an example of a hardware configuration of setting device 20. Setting device 20 provides a development environment of application 220 executed by HMI 200 and a development environment of control program 120 executed by controller 100, and provides an environment for setting the communication environment between controller 100 and HMI 200. Such the development environment and the setting environment are provided by installing a support program in setting device 20. For example, the support program is "Sysmac Studio" (product of OMRON Corporation).

The program developing control program 120, the program developing application 220, and the program generating transmission setting 400 do not need to be packaged and provided in one program, but may be separately provided.

As an example, setting device 20 is implemented using hardware (for example, a general-purpose personal computer) according to a general-purpose architecture. Setting device 20 may be a stationary type, or may be provided in the form of a notebook personal computer having excellent portability at a manufacturing site where controller 100 is disposed.

Referring to FIG. 11, setting device 20 includes a processor 21, an input unit 22, a display 23, a volatile memory 24, a nonvolatile memory 25, an optical drive 26, and universal serial bus (USB) controllers 27A, 27B. These components are connected to each other through a processor bus 28.

Processor 21 is configured by a central processing unit (CPU), a graphical processing unit (GPU), or the like, and reads a program stored in nonvolatile memory 25, expands the program in volatile memory 24, and executes the program, thereby providing functions of producing and debugging control program 120 and application 220 and setting the communication environment between controller 100 and HMI 200 to the user.

Volatile memory 24 is configured by a dynamic random access memory (DRAM), a static random access memory (SRAM), and the like. Nonvolatile memory 25 is configured by a hard disk drive (HDD), a solid state drive (SSD), and the like.

For example, input unit 22 is configured by a mouse and a keyboard. Input unit 22 receives the input of HMI information 350 or priority information 358 and the like. Specifically, input unit 22 is a device operating tab 742, 962 in FIG. 7 or 8.

Display 23 is a display, and for example, displays user interface 700, 900 in FIG. 7 or 8 or the list of data sets in FIG. 9.

Nonvolatile memory 25 stores a controller setting program 1110, an HMI setting program 1120, a display program 1140, evaluation information 1160, and performance information 1180 in addition to an OS (not illustrated) implementing basic functions. Although not illustrated in FIG. 11, nonvolatile memory 25 stores a control program development program that provides the development environment of control program 120 and an application development program that provides the development environment of application 220.

Controller setting program 1110 is a program determining the transmission setting, and is executed by processor 21 to provide the function of arithmetic means 300 in FIG. 2.

HMI setting program 1120 is a program determining the setting regarding the communication of HMI 200. Specifically, link information 98 (see FIG. 4) is generated according to transmission setting 400 determined by the execution of controller setting program 1110.

Display program 1140 is a program displaying user interface 700, 900 in FIG. 7 or 8 or the list of data sets in FIG. 9 on the display 23.

Evaluation information 1160 includes communication load index 352, communication performance index 354, and communication efficiency index 356 in FIG. 6. Evaluation information 1160 may include HMI information 350 and priority information 358. That is, evaluation information 1160 is information regarding evaluation criteria 360 referred to by determination means 340.

Performance information 1180 is information including capacity information 372, and is information indicating the performance of controller 100, information system network 2 connecting controller 100 and HMI 200, and HMI 200.

Although the configuration example in which necessary functions are provided by processor 21 executing the program has been described, some or all of these provided functions may be implemented using a dedicated hardware circuit (for example, an application specific integrated circuit (ASIC), a field-programmable gate array (FPGA), or the like). Furthermore, the function provided by setting device 20 may be implemented using a part of the module provided by the OS.

Setting device 20 includes optical drive 26, and a program stored in recording medium 26A (for example, an optical recording medium such as a digital versatile disc (DVD)) that non-transiently stores a computer-readable program is read and installed in nonvolatile memory 25 or the like.

The program and the like executed by setting device 20 may be installed through computer-readable recording medium 26A, or installed by being downloaded from a server device or the like on the network.

USB controllers 27A, 27B are in charge of data exchange with an arbitrary information processing device through USB connection. Specifically, USB controllers 27A, 27B are in charge of the data exchange with controller 100 or HMI 200. For example, transmission setting 400 is installed in controller 100 through USB controller 27A, and link information 98 is installed in HMI 200 through USB controller 27B.

Examples of a scene in which setting device 20 is used include a scene in which construction of the network including HMI 200 and controller 100 is started, a scene in which HMI 200 is newly added to the network, and a scene in which application 220 is added or corrected.

(f2. Monitoring Device)

Figure 12:
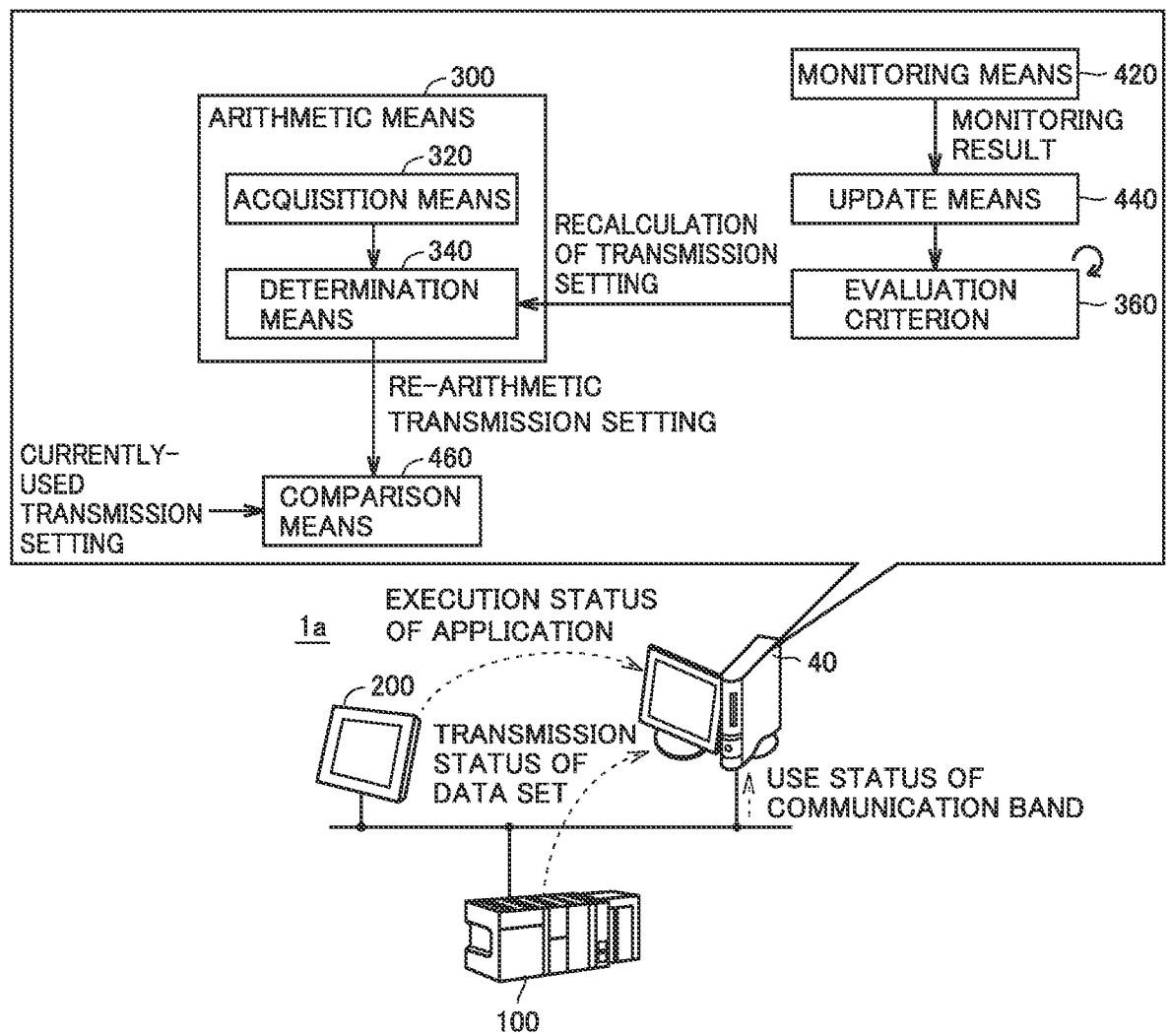
FIG. 12 is a view illustrating an outline of a control system 1a including a monitoring device 40.

For example, monitoring device 40 is used during the operation after the start of connection between controller 100 and HMI 200. FIG. 12 is a view illustrating an outline of a control system 1a including monitoring device 40. Monitoring device 40 is connected to information system network 2, and monitors a transmission status of data set 50 from controller 100, an execution status of application 220 in each HMI 200, and a use status of a communication band of information system network 2.

Referring to FIG. 12, monitoring device 40 includes arithmetic means 300, monitoring means 420, and update means 440. Monitoring means 420 is connected to information system network 2 and monitors the transmission status of data set 50 from controller 100, the execution status of application 220 in each HMI 200, and the usage status of the communication band of information system network 2.

Update means 440 updates the information regarding evaluation criterion 360 according to the monitoring result of monitoring means 420. Update means 440 may update the performance and the like of controller 100, information system network 2, and HMI 200 in addition to the information about evaluation criterion 360.

Determination means 340 again determines the number of data sets 50 and process data 52 to be included in each data set 50 according to evaluation criterion 360 updated by update means 440, and determines transmission setting 400.

Monitoring device 40 may further include comparison means 460. Comparison means 460 compares determined transmission setting 400 to currently-used transmission setting 400, and notifies the user of the comparison result. For example, comparison means 460 gives notice of an effect obtained by changing currently-used transmission setting 400 to determined transmission setting 400 as the comparison result.

According to such the configuration, the transmission setting can be designed in consideration of the actual data exchange between controller 100 and HMI 200. That is, the transmission setting determined when the connection between controller 100 and HMI 200 is started can be improved.

Monitoring device 40 may install determined transmission setting 400 in controller 100, and in this case, link information 98 is also generated again and installed in HMI 200. Monitoring device 40 may only notify the user of the comparison result, and the installation of transmission setting 400 in controller 100 may be started after permission of the user is obtained.

Figure 13:
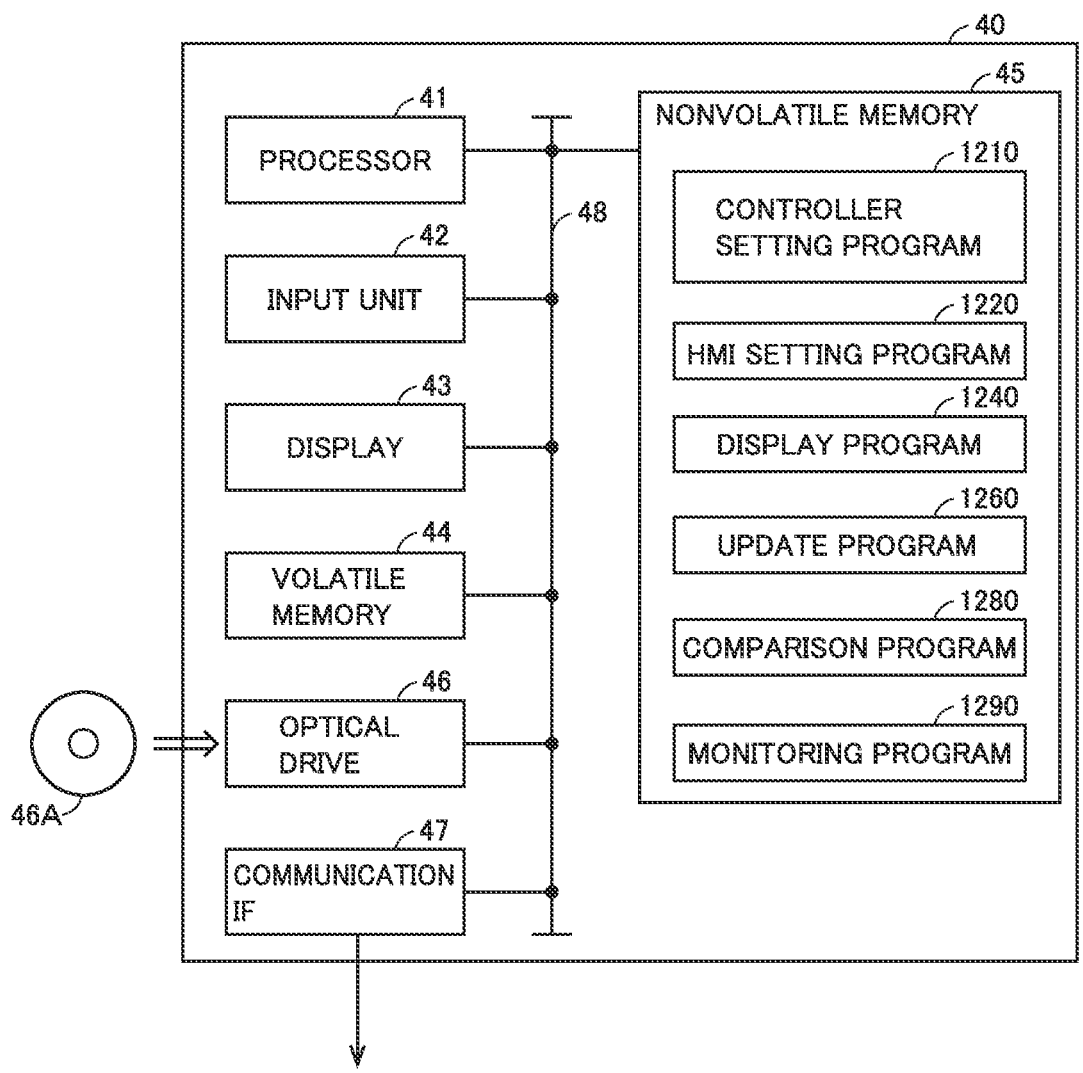
FIG. 13 illustrates a hardware configuration of the monitoring device 40.

FIG. 13 illustrates a hardware configuration of monitoring device 40. As an example, monitoring device 40 is implemented using hardware (for example, a general-purpose personal computer) according to a general-purpose architecture. Monitoring device 40 may be a stationary type, or provided in the form of a notebook personal computer having excellent portability at a manufacturing site where controller 100 is disposed.

Referring to FIG. 13, monitoring device 40 includes a processor 41, an input unit 42, a display 43, a volatile memory 44, a nonvolatile memory 45, an optical drive 46, and a communication IF 47. These components are connected to each other through a processor bus 48.

Processor 41 is configured by a CPU, a GPU, and the like, and reads a program stored in nonvolatile memory 45, develops the program in volatile memory 44, and executes the program, thereby providing functions of producing and debugging control program 120 and application 220, and setting the communication environment between controller 100 and HMI 200 to the user.

Volatile memory 44 is configured by a DRAM, an SRAM, or the like. For example, nonvolatile memory 45 is configured by an HDD and an SSD.

For example, input unit 42 is configured by a mouse and a keyboard. For example, input unit 42 receives permission to install transmission setting 400 in controller 100. Display 43 is a display, and for example, displays the comparison result, details of determined transmission setting 400, information about updated evaluation criterion 360, and performance of updated controller 100, information system network 2, and HMI 200.

Nonvolatile memory 45 stores a controller setting program 1210, an HMI setting program 1220, a display program 1240, an update program 1260, a comparison program 1280, and a monitoring program 1290, in addition to an OS (not illustrated) for implementing basic functions.

Controller setting program 1210 is a program determining the transmission setting, and is executed by processor 41 to provide the function of arithmetic means 300.

HMI setting program 1220 is a program determining the setting regarding the communication of HMI 200. Specifically, link information 98 (see FIG. 4) is generated according to transmission setting 400 determined by the execution of controller setting program 1210.

Display program 1240 is a program displaying the comparison result, details of determined transmission setting 400, information on updated evaluation criterion 360, and performance of updated controller 100, information system network 2, and HMI 200 on display 43.

Update program 1260 is a program updating the information regarding evaluation criterion 360 according to the monitoring result, and is executed by processor 41 to provide the function of update means 440. For example, by executing update program 1260, HMI information 350 is updated such that the worth of the process data of the application having a high execution frequency is enhanced according to the execution status of application 220, each index is updated such that the load is not biased among HMI 200, controller 100, and information system network 2 according to the monitoring result, or priority information 358 is updated.

Comparison program 1280 is a program comparing currently-used transmission setting 400 to determined transmission setting 400, and is executed by processor 41 to provide the function of comparison means 460. The effect obtained by changing currently-used transmission setting 400 to determined transmission setting 400 is calculated by executing comparison program 1280.

Monitoring program 1290 is a program monitoring the transmission status of data set 50 from controller 100, the execution status of application 220 in each HMI 200, and the usage status of the communication band of information system network 2, and is executed by processor 41 to provide the function of monitoring means 420.

Although the configuration example in which necessary functions are provided by processor 41 executing the program has been described, some or all of these provided functions may be mounted using a dedicated hardware circuit (for example, ASIC or FPGA). In addition, the function provided by monitoring device 40 may be implemented using a part of the module provided by the OS.

Monitoring device 40 includes optical drive 46, and a program stored in a recording medium 46A (for example, an optical recording medium such as the DVD) that non-transiently stores a computer-readable program is read from the recording medium and installed in nonvolatile memory 45 or the like.

The program and the like executed by monitoring device 40 may be installed through computer-readable recording medium 46A, or installed by being downloaded from the server device or the like on the network.

Communication IF 47 collects information grasping the transmission situation of data set 50 from controller 100, the execution situation of application 220 in each HMI 200, and the use situation of the communication band of information system network 2 from each device connected to information system network 2, and exchanges the data with each device.

Examples of a scene where monitoring device 40 is used include a scene in which communication according to transmission setting 400 determined using setting device 20 is tested and a scene in which the communication is operated after construction of a network including HMI 200 and controller 100 is completed.

(f3. Relay Device)

Figure 14:
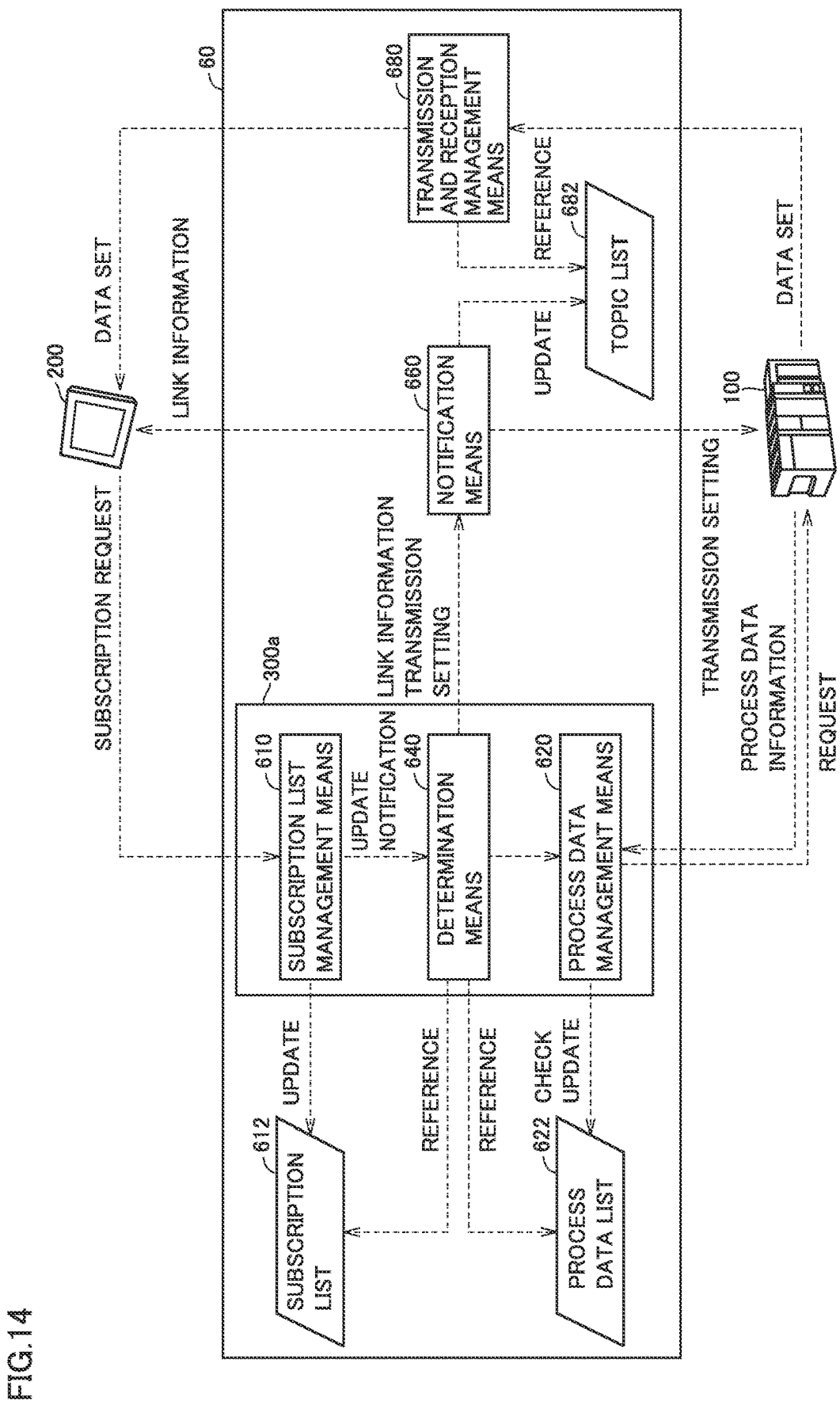
FIG. 14 is a view illustrating an example of a functional configuration of a relay device 60.

Relay device 60 relays the communication between controller 100 and HMI 200. FIG. 14 is a view illustrating an example of a functional configuration of relay device 60. When application 220 executed in one or the plurality of HMIs 200 are changed to change the subscription target, relay device 60 performs the arithmetic operation determining transmission setting 400 according to application 220 executed in the control system, and updates transmission setting 400 and link information 98 according to the operation result.

Referring to FIG. 14, relay device 60 includes subscription list management means 610, process data management means 620, determination means 640, notification means 660, and transmission and reception management means 680.

Subscription list management means 610 acquires information about application 220 executed by HMI 200 connected to relay device 60. The information about application 220 is information capable of specifying process data 52 used for application 220. For example, subscription list management means 610 analyzes the subscription request from HMI 200 and acquires information about application 220 executed by HMI 200. At this point, subscription list management means 610 corresponds to an example of the acquisition means of the present invention.

Subscription list management means 610 manages subscription list 612 capable of specifying process data 52 that is the subscription target in the control system and HMI 200 to which the process data is set to the subscription target. Subscription list management means 610 specifies process data 52 used by application 220 executed in HMI 200 based on the subscription request from HMI 200, and registers (updates) the process data in subscription list 612 as the subscription target. When the subscription target is changed, subscription list management means 610 specifies the process data in which the subscription is stopped, and reflects (updates) the stop of the subscription in subscription list 612. When subscription list 612 is updated, subscription list management means 610 notifies determination means 640 of the update (update notification in FIG. 14).

Process data management means 620 manages a process data list 622 that defines a correspondence between process data 52 and controller 100 that distributes process data 52. When the communication between relay device 60 and controller 100 is established, process data management means 620 requests controller 100 to transmit the information indicating managed process data 52. Upon receiving the information indicating process data 52 (the process data information in FIG. 15), process data management means 620 checks whether the correspondence between controller 100 and process data 52 managed by controller 100 is registered in process data list 622, and when the correspondence is not registered, the correspondence is registered (updated) in process data list 622.

Upon receiving the update notification from subscription list management means 610, determination means 640 determines transmission setting 400 in order to transmit process data 52 of the subscription target. Determination means 640 specifies process data 52 used by currently-executed application 220 based on subscription list 612. Determination means 640 groups the process data specified based on process data list 622 for each controller 100 that manages the process data. Determination means 640 determines transmission setting 400 of controller 100 that manages a family of process data 52 for each of the grouped family of process data 52. Because the method described above can be used as the method for determining transmission setting 400, the description thereof will be omitted.

That is, determination means 640, subscription list management means 610, and process data management means 620 operate in cooperation with each other to determine transmission setting 400. That is, determination means 640, subscription list management means 610, and process data management means 620 constitute arithmetic means 300a for determining transmission setting 400.

Determination means 640 generates link information 98 about each HMI 200 based on determined transmission setting 400 of each determined controller 100.

Notification means 660 notifies controller 100 of transmission setting 400 obtained by determination means 640, and notifies HMI 200 of link information 98. When link information 98 is generated for each HMI 200, each link information 98 is transmitted to corresponding HMI 200.

Notification means 660 updates the information about topic list 682 that defines a transmission destination of each data set 50 based on transmission setting 400 and subscription list 612.

Transmission and reception management means 680 refers to topic list 682 to transmit each data set 50 delivered from controller 100 to HMI 200 in which the process data 52 included in data set 50 is the subscription target.

When transmission setting 400 is determined, determination means 640 may determine the transmission setting such that the number of changes from already-set transmission setting 400 is reduced.

Figure 15:
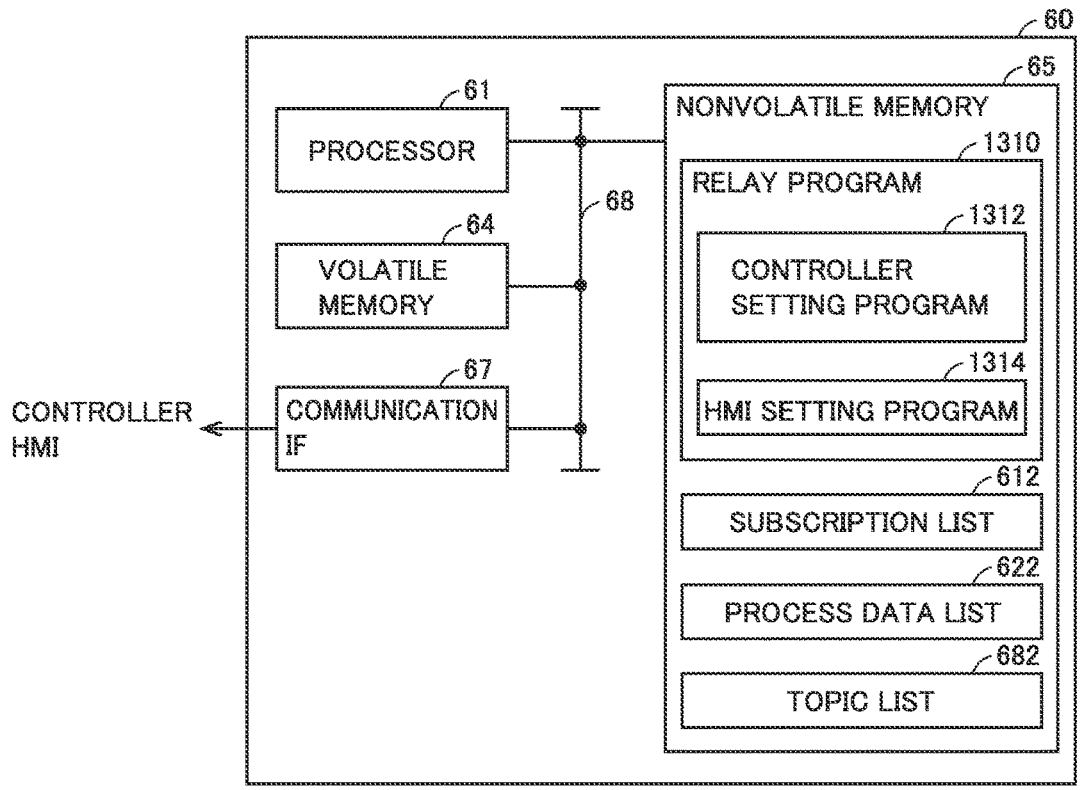
FIG. 15 is a schematic view illustrating an example of a hardware configuration of the relay device 60.

FIG. 15 is a schematic view illustrating an example of a hardware configuration of relay device 60. Referring to FIG. 15, relay device 60 includes a processor 61, a volatile memory 64, a nonvolatile memory 65, and a communication IF 67. These components are connected to each other through a processor bus 68.

Processor 61 includes a CPU, a GPU, and the like, and reads a program stored in nonvolatile memory 65, develops the program in volatile memory 64, and executes the program, thereby providing the functions of determining transmission setting 400 and relaying the communication between controller 100 and HMI 200.

Volatile memory 64 includes a DRAM, an SRAM, or the like. For example, nonvolatile memory 65 includes an HDD and an SSD.

Nonvolatile memory 65 stores a relay program 1310, a subscription list 612, a process data list 622, and a topic list 682 in addition to the OS for implementing the basic functions.

Relay program 1310 is a program relaying the communication between controller 100 and HMI 200 and determining transmission setting 400, and provides functions of various means in FIG. 14 by executing processor 61. Relay program 1310 includes a controller setting program 1312 determining transmission setting 400 and an HMI setting program 1314 generating link information 98 of HMI 200 according to determined transmission setting 400. In the example of FIG. 14, that determination means 640 generates link information 98 and transmission setting 400 has been described in order to simplify the drawing, but the function of generating transmission setting 400 and the function of generating link information 98 may be separately provided.

Although the configuration example in which the necessary functions are provided by processor 61 executing the program has been described, some or all of these provided functions may be mounted using a dedicated hardware circuit (for example, ASIC or FPGA). Furthermore, the function provided by relay device 60 may be implemented using a part of the module provided by the OS.

The various programs stored in nonvolatile memory 65 may be installed through the computer-readable recording medium, or installed by being downloaded from the server device or the like on the network.

Communication IF 67 exchanges the data with each device (controller 100, HMI 200) connected to information system network 2.

As described above, relay device 60 temporarily determines optimum transmission setting 400 at certain timing, and changes transmission setting 400 according to the change of application 220 executed on the network. Optimum transmission setting 400 is transmission setting 400 acquired by determination means 640, and what is referred to as "optimum transmission setting 400" differs depending on evaluation criterion 360 referred to by determination means 640.

In other words, because relay device 60 arbitrates data set 50 exchanged between controller 100 and HMI 200 executing application 220, it can also be said that relay device 60 is arbitration means.

The use scene of relay device 60 is wide, and relay device 60 can be consistently used from the start to the end of the communication between HMI 200 and controller 100.

F. Hardware Configuration of HMI

Figure 16:
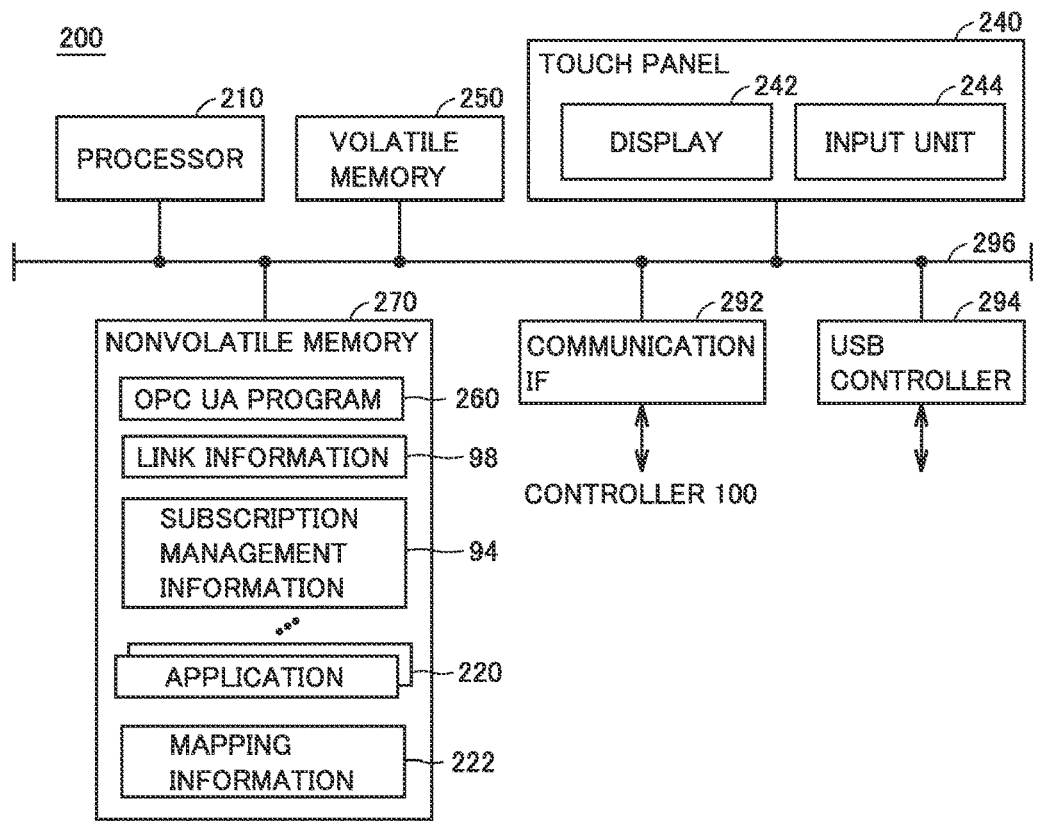
FIG. 16 is a schematic diagram illustrating an example of a hardware configuration of an HMI 200.

FIG. 16 is a schematic diagram illustrating an example of a hardware configuration of HMI 200. As an example, HMI 200 is implemented using hardware (for example, a general-purpose personal computer) according to a general-purpose architecture. HMI 200 may be a stationary type or provided in the form of a notebook personal computer having excellent portability at a manufacturing site where controller 100 is disposed. Referring to FIG. 16, HMI 200 includes a processor 210, a touch panel 240, a volatile memory 250, a nonvolatile memory 270, a communication IF 292, and a USB controller 294. These components are connected to each other through a processor bus 296.

Processor 210 includes a CPU, a GPU, and the like, reads a program stored in nonvolatile memory 270, develops the program in the volatile memory 250, and executes the program, thereby outputting various types of information obtained by executing control program 120 to touch panel 240.

Volatile memory 250 is configured by a DRAM, an SRAM, or the like. For example, nonvolatile memory 270 is configured by an HDD or an SSD.

Nonvolatile memory 270 stores an OPC UA program 260, subscription management information 94, link information 98, one or a plurality of applications 220, and mapping information 222 in addition to an OS (not illustrated) implementing basic functions.

OPC UA program 260 is a program causing HMI 200 to function as the subscriber, and is a program performing the communication according to the OPC UA between controller 100 and HMI 200. Processor 210 executes OPC UA program 260 to provide the functions regarding communication processing unit 90 in FIG. 4. OPC UA program 260 is installed in non-volatile memory 270 from another external storage medium (for example, a memory card or a server device on a network).

Although the configuration example in which the necessary functions are provided by processor 210 executing the program has been described, some or all of these provided functions may be mounted using a dedicated hardware circuit (for example, ASIC or FPGA). In addition, the function provided by HMI 200 may be implemented using a part of the module provided by the OS.

Touch panel 240 includes a display 242 that is the display and an input unit 244 that receives the operation of the user. Display 242 and input unit 244 may be configured separately.

Communication IF 292 is in charge of the data exchange with controller 100. USB controller 294 is in charge of the data exchange with arbitrary information processing device through USB connection.

G. Hardware Configuration of Controller 100

Figure 17:
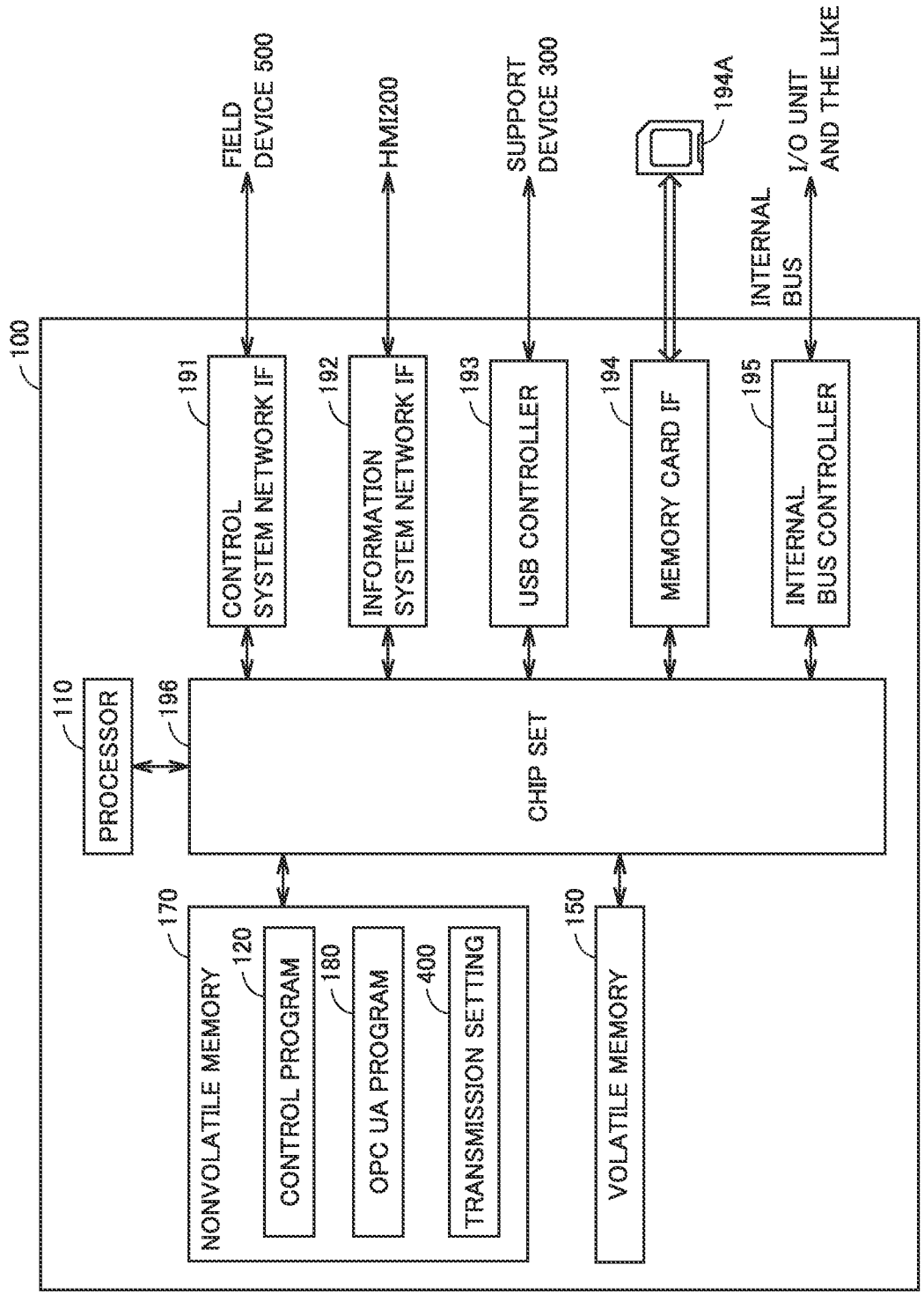
FIG. 17 is a schematic diagram illustrating an example of a hardware configuration of the controller 100.

FIG. 17 is a schematic diagram illustrating an example of the hardware configuration of controller 100. Referring to FIG. 17, controller 100 includes a processor 110, a chipset 196, a nonvolatile memory 170, a volatile memory 150, a control system network IF 191, an information system network IF 192, a USB controller 193, a memory card IF 194, and an internal bus controller 195 as main components.

Processor 110 is configured by a CPU, a GPU, and the like, and reads various programs stored in nonvolatile memory 170, develops the programs in volatile memory 150, and executes the programs, thereby implementing the control of field device 500 and the function as the publisher. A chipset 196 mediates the exchange of data between processor 110 and each component, thereby implementing the processing of controller 100 as a whole.

Nonvolatile memory 170 stores control program 120, OPC UA program 180, and transmission setting 400.

Control program 120 is typically configured by the user program generated by the user who operates and designs setting device 20, and the system program that provides the basic functions of controller 100. The user program and the system program cooperate in implementing the control purpose in the user, thereby controlling field device 500.

OPC UA program 180 is a program causing controller 100 to function as the publisher, and is a program performing the communication according to the OPC UA between controller 100 and HMI 200. Processor 110 executes OPC UA program 180 to provide the functions regarding communication processing unit 80 in FIG. 5. For example, OPC UA program 180 may be previously installed in controller 100 as a type of the system program, or installed in nonvolatile memory 170 from another external storage medium (for example, memory card 194A and the server device on the network).

Although the configuration example in which the necessary functions are provided by processor 110 executing the program has been described, some or all of these provided functions may be mounted using a dedicated hardware circuit (for example, ASIC or FPGA). In addition, the main part of controller 100 may be implemented using hardware (for example, an industrial personal computer based on a general-purpose personal computer) according to a general-purpose architecture. In this case, a plurality of OSs having different uses may be executed in parallel using a virtualization technology, and the necessary application may be executed on each OS.

Control system network IF 191 is in charge of the data exchange with field device 500.

Information system network IF 192 is in charge of the data exchange with HMI 200.

USB controller 193 is in charge of the data exchange with any information processing device through the USB connection.

Memory card IF 194 is configured such that memory card 194A is detachable, the data such as the control program and various settings can be written in memory card 194A, and the data such as the control program and various settings can be read from memory card 194A.

Internal bus controller 195 is an interface that exchanges the data with an I/O unit (not illustrated) mounted on controller 100. For the internal bus, a communication protocol unique to a manufacturer may be used, or a communication protocol that is the same as or compliant with any of industrial network protocols may be used.

G. Modification of Control System

In the embodiment, controller 100 generates and transmits data set 50 of a predetermined combination according to predetermined transmission setting 400. Controller 100 may transmit or may not transmit each data set 50 according to application 220 executed by one or the plurality of HMIs 200 executing application 220 using process data 52 of controller 100.

Figure 18:
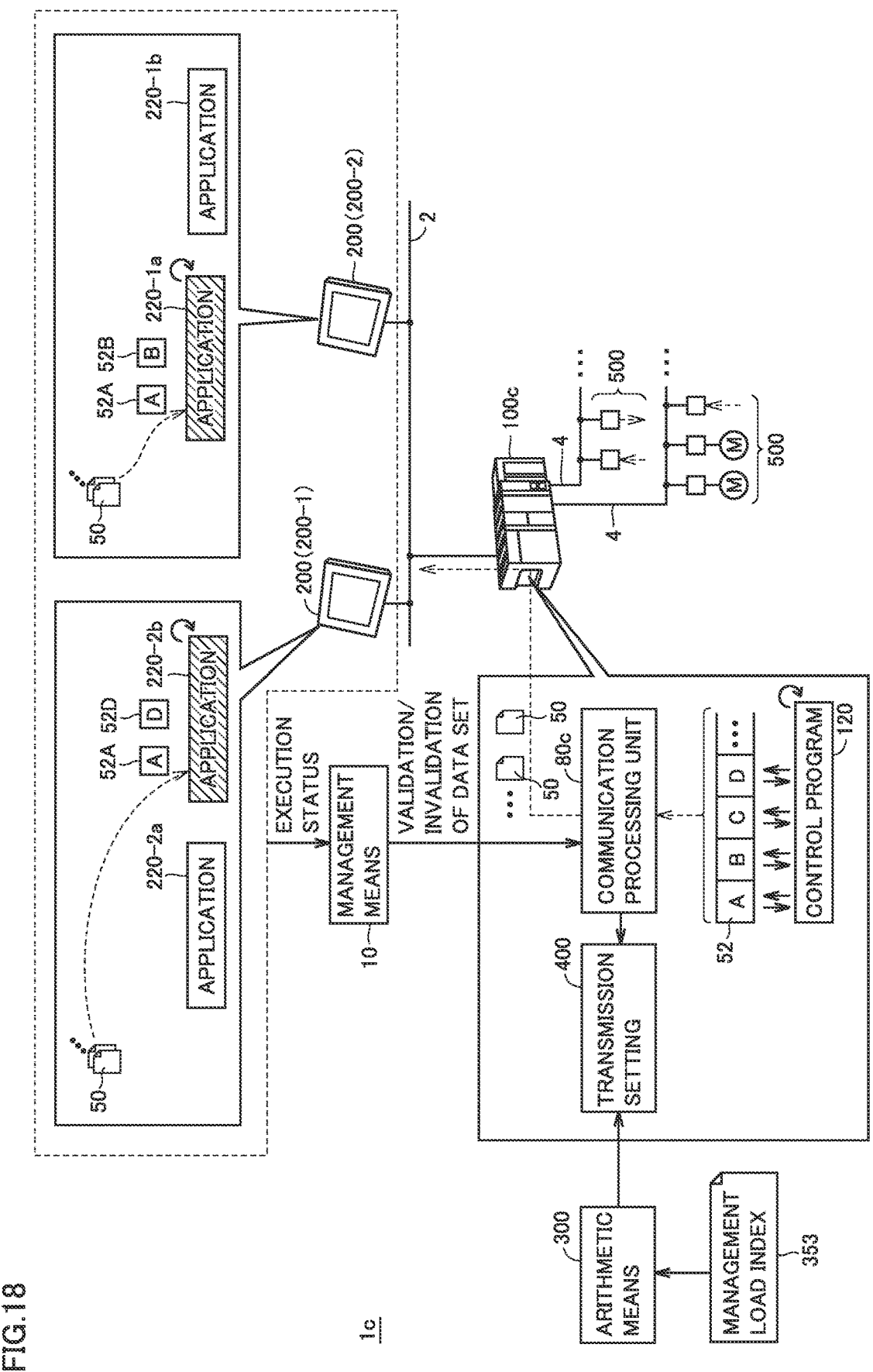
FIG. 18 is a view schematically illustrating a control system 1c according to a modification.

FIG. 18 is a view schematically illustrating a control system 1c according to a modification. Referring to FIG. 18, control system 1c is different from control system 1 in FIG. 1 in that management means 10 is provided and a controller 100c is provided instead of controller 100.

Controller 100c is different from controller 100 in that a communication processing unit 80c is provided instead of communication processing unit 80. Communication processing unit 80c can generate and transmit the plurality of data sets 50 including a plurality of pieces of process data values according to transmission setting 400.

Management means 10 determines data set 50 that validates the transmission among data sets 50 that can be transmitted by communication processing unit 80c according to the application executed by each of the plurality of HMIs 200-1, 200-2 that execute application 220 upon receiving the distribution of data set 50 from controller 100c.

That is, management means 10 determines the data set that validates the transmission among data sets generated by a predetermined combination of process data 52, according to the currently-executed application.

For example, management means 10 validates the transmission of data set 1 and data set 2 and invalidates the transmission of data sets 3 to 5 when controller 100 can transmit data set 1 to data set 5 and when process data 52 necessary for the currently-executed application 220 is provided from controller 100c toward HMI 200 by the delivery of data set 1 and data set 2.

As a result, the distribution of the data set that is not used for the execution of the application can be prevented, and the processing load on controller 100 can be reduced.

Furthermore, in this case, arithmetic means 300 may determine transmission setting 400 in consideration of the fact that management means 10 is provided in control system 1c. That is, arithmetic means 300 may determine the number of data sets and process data 52 to be included in each data set according to the evaluation criterion including a management load index 353 evaluating the load applied to management means 10.

When the combination of process data 52 stored in data set 50 is determined according to the evaluation criterion including management load index 353, for example, process data 52 included in each application 220 that is not simultaneously executed is determined to be stored in another data set.

In such the control system 1c, as compared with control system 1, the processing load causing the management means to newly function is applied to control system 1c by including management means 10. However, by including the processing load for causing the management means to function in the evaluation criterion, while the transmission of the data set that is not used is prevented, the processing load applied for preventing such the transmission can also be reduced, thereby reducing the processing load applied to the entire control system 1c.

Other Modifications

In the above embodiment, the HMI is the subscriber while the controller is the publisher has been described. Each of the HMI and the controller may have both functions of the subscriber and the publisher.

In this case, the control program is configured to be able to use the data distributed from the HMI. The transmission setting of the HMI may be determined by the arithmetic means according to the control program. As a method for determining the transmission setting of the HMI, the method for determining transmission setting 400 of controller 100 described above can be used.

It is not necessary to generate transmission setting 400 such that one application uses all process data 52 included in one data set 50. In this case, evaluation criterion 360 may include an index regarding the load applied to the processing of sorting process data 52 used for application 220 from data set 50.

Further, in the above embodiment, in order to simplify the description, all the pieces of process data 52 used in the application are transmitted by one controller 100, but each of the plurality of pieces of process data 52 used in application 220 may be transmitted from different controllers 100.

In this case, arithmetic means 300 may group the plurality of pieces of process data 52 for each controller transmitting the plurality of pieces of process data 52 acquired by acquisition means 320, and cause determination means 340 to generate the transmission setting for each group.

In addition, transmission setting 400 may be generated in consideration of the period at which process data 52 is updated by controller 100 and the period used in application 220.

G. Appendix

As described above, the embodiment includes the following disclosure.

(Configuration 1)
A control system (100, 1a, 1c) includes: a control device (100, 100c) configured to execute a control program (120) controlling a control target (500) while managing a plurality of pieces of process data (52) referred to or updated in the control program, the control device including a communication processing unit (80, 80c) configured to periodically transmit one or a plurality of predetermined data sets (50), each data set including a value of one or a plurality of predetermined process data in the plurality of pieces of process data; one or a plurality of information processing devices (200) configured to execute one or a plurality of applications (220) using the value of the process data included in the one or the plurality of data sets transmitted from the control device; and an arithmetic unit (300, 300a) configured to determine a transmission setting of the data set by the communication processing unit of the control device, wherein the arithmetic unit includes: an acquisition unit (320, 610) configured to acquire the process data necessary for each of the one or the plurality of applications executed in the information processing device for each of the one or the plurality of information processing devices; and a determination unit (340, 640) configured to determine a number of data sets transmitted by the communication processing unit and the process data to be included in each data set according to a predetermined evaluation criterion (360) regarding a communication load based on the process data necessary for each application acquired by the acquisition unit.

(Configuration 2)
The control system described in configuration 1, the evaluation criterion includes a communication load index (352) that evaluates a load applied to the control device by periodically transmitting each of the one or the plurality of data sets while the communication processing unit generates the one or the plurality of data sets.

(Configuration 3)
The control system described in configuration 1 or 2, the evaluation criterion includes a communication performance index (354) that evaluates a type of the process data receivable by the information processing device during a predetermined period.

(Configuration 4)
The control system described in any one of configurations 1 to 3, the evaluation criterion includes a communication efficiency index (356) that evaluates communication efficiency between the control device and the one or the plurality of information processing devices.

(Configuration 5)
The control system described in any one of configurations 1 to 4, the determination unit includes a worth determination unit (342) configured to determine worth of the process data for each of the process data acquired by the acquisition unit, and the evaluation criterion includes an index that evaluates the worth of the process data included in each data set.

(Configuration 6)
The control system described in configuration 5 further includes a unit (700, 740, 742) configured to receive importance of the information processing device, and the worth determination unit determines the worth of the process data according to the importance (350) of the information processing device configured to use the process data.

(Configuration 7)
The control system described in any one of configurations 1 to 6 further includes a management unit (10) configured to determine a data set that validates transmission in one or a plurality of data sets transmittable by the communication processing unit according to an application that is executed in the one or the plurality of information processing devices, and the evaluation criterion includes a management load index (353) that evaluates a load on the management unit by managing determination of the validation of each of the one or the plurality of data sets.

(Configuration 8)
The control system described in any one of configurations 1 to 7 further includes a unit (900, 960, 962) configured to receive the importance of each of a plurality of evaluation indexes, and the evaluation criterion includes the plurality of evaluation indexes (352, 354).

(Configuration 9)
The control system (1a) described in any one of configurations 1 to 7 further includes a monitoring device (40) configured to monitor a communication load, the monitoring device includes: the arithmetic unit (300); and an update unit (440) configured to update the evaluation criterion according to a result of monitoring the communication load, and the determination unit determines the number of data sets transmitted by the communication processing unit and the process data to be included in each data set according to the evaluation criterion updated by the update unit.

(Configuration 10)

A setting device (20, 40, 60) configured to assist setting of a communication environment between a control device (100, 100c) configured to execute a control program (120) controlling a control target (500) while managing a plurality of pieces of process data (52) referred to or updated in the control program and one or a plurality of information processing devices (200) configured to execute one or a plurality of applications (220) using a value of one or a plurality of pieces of process data designated in the plurality of pieces of process data, the control device including a communication processing unit (80, 80c) configured to periodically transmit one or a plurality of predetermined data sets (50), each data set including a value of one or a plurality of predetermined process data in the plurality of pieces of process data, the setting device includes: an acquisition unit (320, 610) configured to acquire process data necessary for each of the one or the plurality of applications executed in the information processing unit for each of the one or the plurality of information processing devices; and a determination unit (340, 640) configured to determine a number of data sets transmitted by the communication processing unit (80, 80c) and process data to be included in each data set according to a predetermined evaluation criterion regarding a communication load based on the process data necessary for each application acquired by the acquisition unit.

(Configuration 11)

A setting program (1110, 1210, 1312) configured to assist setting of a communication environment between a control device (100, 100c) configured to execute a control program (120) controlling a control target (500) while managing a plurality of pieces of process data (52) referred to or updated in the control program and one or a plurality of information processing devices (200) configured to execute one or a plurality of applications (220) using a value of one or a plurality of pieces of process data designated in the plurality of pieces of process data, the control device including a communication processing unit (80, 80c) configured to periodically transmit one or a plurality of predetermined data sets (50), each data set including a value of one or a plurality of predetermined process data in the plurality of pieces of process data, the setting program causes to computer (20, 40, 60) to execute: a step (320, 610) of acquiring process data necessary for each of the one or the plurality of applications executed in the information processing unit for each of the one or the plurality of information processing devices; and a step (340, 640) of determining a number of data sets transmitted by the communication processing unit and process data to be included in each data set according to a predetermined evaluation criterion regarding a communication load based on the process data necessary for each application acquired in the acquiring process data.

It should be considered that the disclosed embodiment is an example in all respects and not restrictive. The scope of the present invention is defined by not the above description, but the claims, and it is intended that all modifications within the meaning and scope of the claims are included in the present invention. In addition, the inventions described in the embodiment and the modification are intended to be implemented alone or in combination as much as possible.

REFERENCE SIGNS LIST 1, 1a, 1c: control system, 2: information system network, 4: control system network, 10: management means, 20: setting device, 21, 41, 61, 110, 210: processor, 22, 42, 244: input unit, 23, 43, 242: display, 24, 44, 64, 150, 250: volatile memory, 25, 45, 65, 170, 270: non-volatile memory, 26, 46: optical drive, 26A, 46A: recording medium, 27A, 27B, 193, 294: USB controller, 28, 48, 68, 296: processor bus, 40: monitoring device, 47, 67, 292: communication IF, 50: data set, 52: process data, 54: object, 60: relay device, 80, 80c, 90: communication processing unit, 82: data set generation means, 84, 96: communication driver, 92: subscription management means, 94: subscription management information, 98: link information, 100, 100c: controller, 120: control program, 180, 260: OPC UA program, 191: control system network IF, 192: information system network IF, 194: memory card IF, 194A: memory card, 195: internal bus controller, 196: chip set, 200: HMI, 220: application, 222: mapping information, 240: touch panel, 300, 300a: arithmetic means, 320: acquisition means, 340, 640: determination means, 342: worth determination means, 344: candidate calculation means, 346: evaluation means, 348: determination means, 350: HMI information, 352: communication load index, 353: management load index, 354: communication performance index, 356: communication efficiency index, 358: priority information, 360: evaluation criterion, 370: worth information, 372: capacity information, 374: candidate data, 400: transmission setting, 420: monitoring means, 440: update means, 460: comparative means, 500: field device, 610: subscription list management means, 612: subscription list, 620: process data management means, 622: process data list, 660: notification means, 680: transmission and reception management means, 682: topic list, 700, 900: user interface, 720: network configuration region, 740: reception region, 742, 962: tab, 920: index region, 940: result display region, 960: priority reception region, 980: start button, 1110, 1210, 1312: controller setting program, 1120, 1220, 1314: HMI setting program, 1140, 1240: display program, 1160: evaluation information, 1180: performance information, 1260: update program, 1280: comparison program, 1290: monitoring program, 1310: relay program

The invention claimed is:

1. A control system comprising:
a control device configured to execute a control program controlling a control target while managing a plurality of pieces of process data referred to or updated in the control program, the control device including a first memory that stores a first program, and a first processor that accesses the first memory and executes the first program to periodically transmit one or more data sets, each data set including a value of one or more process data of the plurality of pieces of process data;
one or more information processing devices, each including a second memory that stores a second program, and a second processor that accesses the second program and executes the second program to execute one or more applications using the value of the one or more process data included in the one or more data sets transmitted from the control device; and
a monitoring device including a third memory that stores a third program, and a third processor that accesses the third program and executes the third program to:
monitor a communication load,
determine a transmission setting of a data set transmitted by the control device,
acquire process data necessary for each of the one or more applications executed in the one or more information processing devices,
determine a number of the one or more data sets transmitted by the control device and process data to be included in each of the determined number of data sets according to an evaluation criterion regarding the communication load based on the acquired process data necessary for each of the one or more applications, update the evaluation criterion according to a result of monitoring the communication load, and determine the number of the one or more data sets transmitted by the control device and the process data to be included in each data set according to the updated evaluation criterion.

2. The control system according to claim 1, wherein the evaluation criterion includes a communication load index that evaluates a load applied to the control device by periodically transmitting each of the one or more data sets while the control device generates the one or more data sets.

3. The control system according to claim 1, wherein the evaluation criterion includes a communication performance index that evaluates a type of the process data receivable by each of the one or more information processing devices during a predetermined period.

4. The control system according to claim 1, wherein the evaluation criterion includes a communication efficiency index that evaluates a communication efficiency between the control device and the one or more information processing devices.

5. The control system according to claim 1, wherein the third processor further executes the third program to determine a worth of the process data for each of the acquired process data, and the evaluation criterion includes an index that evaluates the worth of the process data included in each data set.

6. The control system according to claim 5, wherein the third processor further executes the third program to receive an importance of each of the one or more information processing devices, and determine the worth of the acquired process data according to an importance of the information processing device that uses the acquired process data.

7. The control system according to claim 1, wherein the third processor further executes the third program to determine a data set that validates transmission in one or more data sets transmittable by the control device according to the one or more application executed in the one or more information processing devices, and wherein the evaluation criterion includes a management load index that evaluates a load on the monitoring device by managing a determination of the validation of each of the one or more data sets.

8. The control system according to claim 1, wherein the third processor further executes the third program to receive an importance of each of a plurality of evaluation indexes, wherein the evaluation criterion includes the plurality of evaluation indexes.

9. A setting device that assists setting of a communication environment between a control device that executes a control program controlling a control target while managing a plurality of pieces of process data referred to or updated in the control program and one or more information processing devices that execute one or more applications using a value of one or more pieces of process data designated in the plurality of pieces of process data, the control device configured to periodically transmit one or more data sets, each data set including a value of one or more process data of the plurality of pieces of process data, the setting device comprising a memory that stores a program and a processor that accesses the memory and executes the program to:

acquire process data necessary for each of the one or more applications executed in the each of the one or more information processing devices; and determine a number of data sets transmitted by the control device and process data to be included in each of the determined number of data sets according to an evaluation criterion regarding a communication load based on the acquired process data necessary for each application, update the evaluation criterion according to a result of monitoring the communication load, and determine the number of the one or more data sets transmitted by the control device and the process data to be included in each data set according to the updated evaluation criterion.

10. The setting device according to claim 9, wherein the evaluation criterion includes a communication load index that evaluates a load applied to the control device by periodically transmitting each of the one or more data sets while the control device generates the one or more data sets.

11. The setting device according to claim 9, wherein the evaluation criterion includes a communication performance index that evaluates a type of the process data receivable by each of the one or more information processing devices during a predetermined period.

12. The setting device according to claim 9, wherein the evaluation criterion includes a communication efficiency index that evaluates a communication efficiency between the control device and the one or more information processing devices.

13. A non-transitory computer-readable storage medium storing a setting program configured to assist setting of a communication environment between a control device configured to execute a control program controlling a control target while managing a plurality of pieces of process data referred to or updated in the control program and one or more information processing devices configured to execute one or more applications using a value of one or more pieces of process data designated in the plurality of pieces of process data, the control device configured to periodically transmit one or more data sets, each data set including a value of one or more process data of the plurality of pieces of process data, wherein the setting program, when executed by a computer, causes the computer to:

acquire process data necessary for each of the one or more applications executed in each of the one or more information processing devices;

determine a number of data sets transmitted by the control device and process data to be included in each data set of the determined number of data sets according to an evaluation criterion regarding a communication load based on the acquired process data necessary for each of the one or more applications, update the evaluation criterion according to a result of monitoring the communication load, and determine the number of the one or more data sets transmitted by the control device and the process data to be included in each data set according to the updated evaluation criterion.

14. The non-transitory computer-readable storage medium according to claim 13, wherein the evaluation criterion includes a communication load index that evaluates a load applied to the control device by periodically transmitting each of the one or more data sets while the control device generates the one or more data sets.

15. The non-transitory computer-readable storage medium according to claim 13, wherein the evaluation criterion includes a communication performance index that evaluates a type of the process data receivable by each of the one or more information processing devices during a predetermined period.

16. The non-transitory computer-readable storage medium according to claim 13, wherein the evaluation criterion includes a communication efficiency index that evaluates a communication efficiency between the control device and the one or more information processing devices.

* * * * *